Sept. 30, 1941.  H. W. KOREN  2,257,263
AUDIOMETER
Filed Aug. 1, 1940  6 Sheets-Sheet 2

INVENTOR
Heiman W. Koren
BY S Michael Pineles
ATTORNEY.

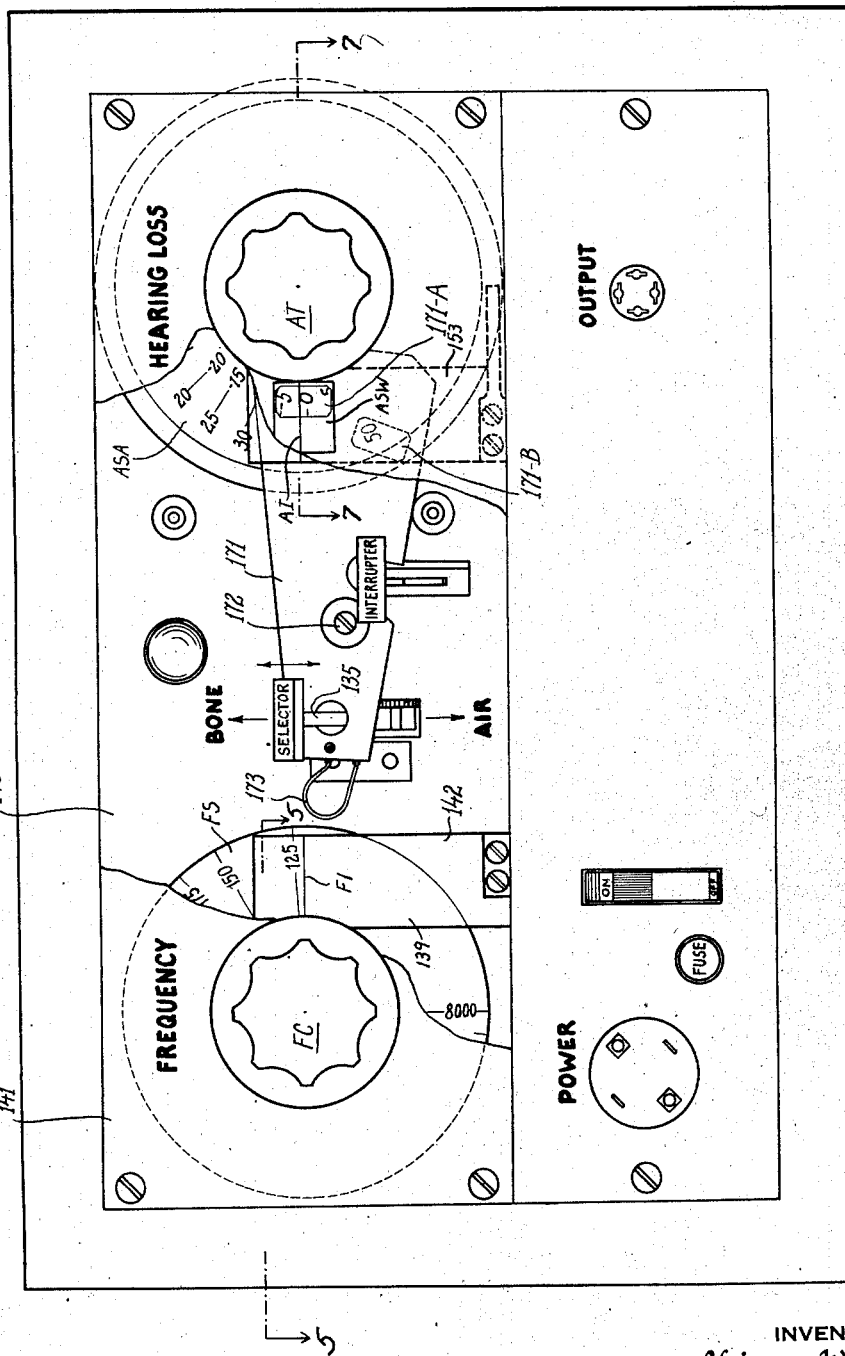

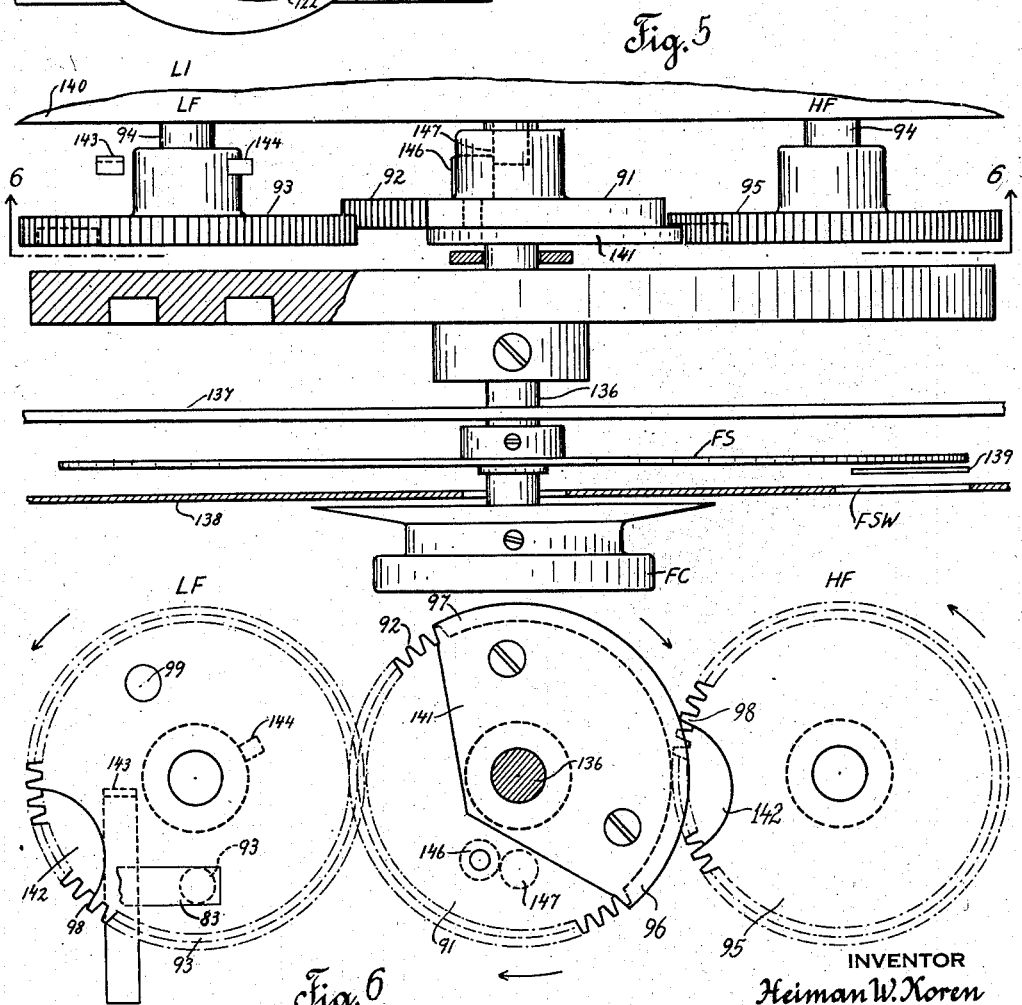

Sept. 30, 1941.  H. W. KOREN  2,257,263
AUDIOMETER
Filed Aug. 1, 1940   6 Sheets-Sheet 5

INVENTOR
Heiman W. Koren
BY S. Michael Priele
ATTORNEY

Sept. 30, 1941.  H. W. KOREN  2,257,263
AUDIOMETER
Filed Aug. 1, 1940    6 Sheets-Sheet 6
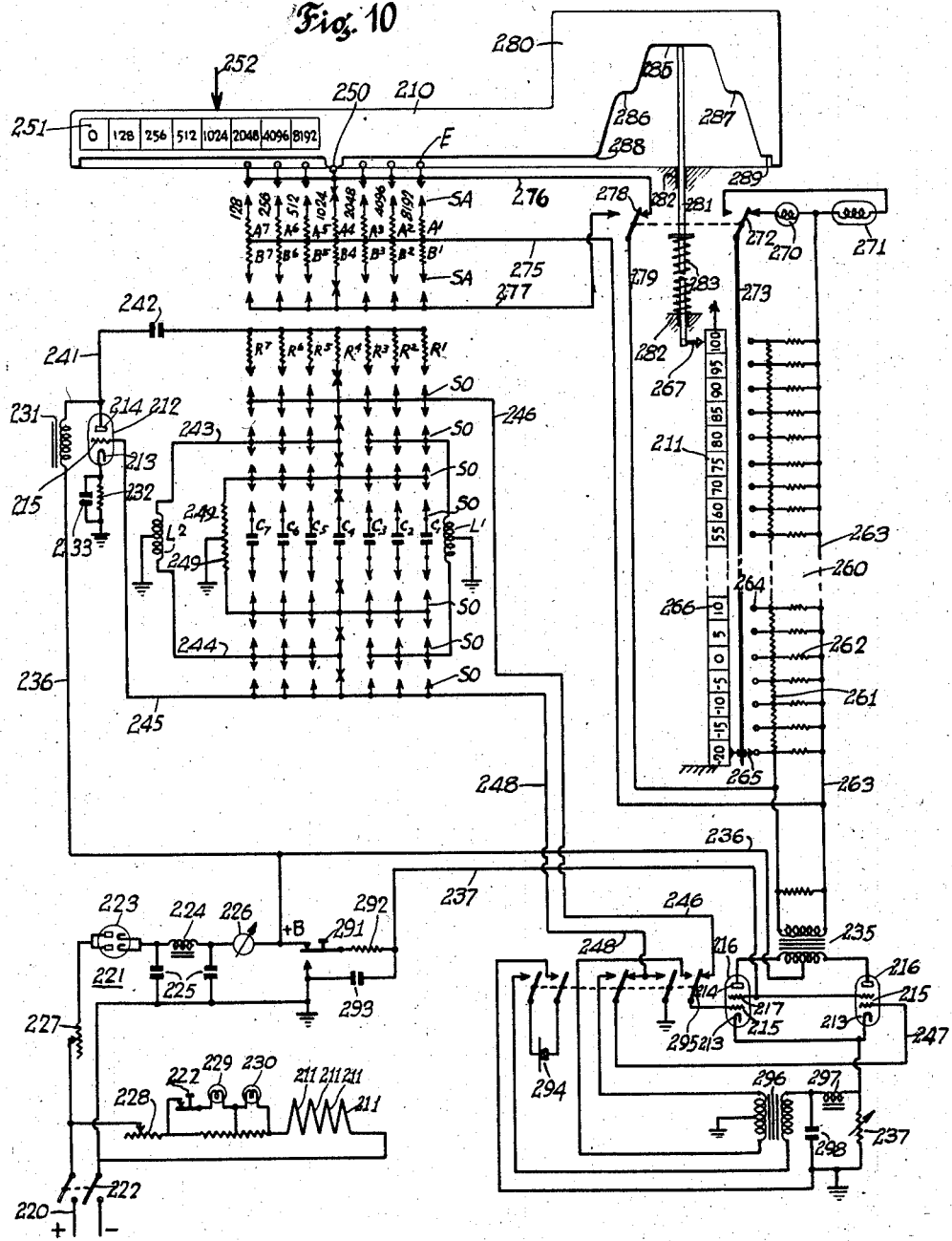
INVENTOR
Heiman W. Koren
BY S. Michael Prieler
ATTORNEY.

Patented Sept. 30, 1941

2,257,263

UNITED STATES PATENT OFFICE 2,257,263

AUDIOMETER

Heiman W. Koren, Bronx, N. Y., assignor to Sonotone Corporation, Elmsford, N. Y., a corporation of New York Application August 1, 1940, Serial No. 349,045

55 Claims. (Cl. 179—1)

This application is a continuation-in-part of my application Serial No. 277,882, filed June 7, 1939.

This invention relates to measuring arrangements, such as audiometers. Among the objects of the invention is a novel combination of an electric oscillation generator arrangement and a sound reproducer supplied thereby with an attenuator arrangement for accurately regulating the sound output at different frequencies for measuring the hearing sensitivity of an individual, and similar applications; and improved methods and arrangements for controlling and operating such equipments.

The foregoing and other objects of the invention will be best understood from the following description of exemplifications thereof, reference being had to the accompanying drawings wherein Fig. 1 is a diagram showing the circuit connections and the cooperative relationship of the elements of an audiometer utilizing an oscillation generator and exemplifying certain other features of the invention;

Fig. 3 is an elevational view with parts broken away illustrating the panel of an audiometer designed in accordance with the principles illustrated diagrammatically in Fig. 1;

Fig. 4 is a sectional view with parts broken away showing a part of the mechanism of the audiometer of Fig. 2, as illustrated diagrammatically in Fig. 1;

Fig. 5 is a horizontal sectional view along line 5—5 of Fig. 3;

Fig. 6 is a sectional view along line 6—6 of Fig. 5;

Fig. 10 is a diagram similar to Fig. 1 illustrating another audiometer arrangement exemplifying the invention.

Figure 2:
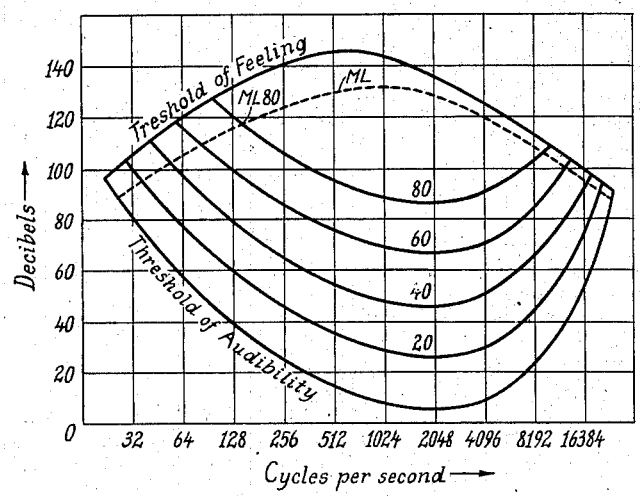
Fig. 2 is a diagram showing the hearing characteristics of a normal person.

An ideal audiometer should enable a person without technical skill to make accurate measurements of the hearing sensitivity of an individual over the principal frequency range of audible sound. The design of a satisfactory audiometer must take into consideration the hearing characteristics of a person having normal hearing as determined from accurate measurements of the hearing sensitivity of a group of individuals having good normal hearing. Typical results of such measurements are shown in the audiogram of Fig. 2 wherein the lower curve marked "Threshold of audibility" and the upper curve marked "Threshold of feeling" give the limits of the hearing ability of a person having normal hearing. The lower curve shows, for each frequency, the intensity of the sound in decibels, above an arbitrarily chosen level, at which the tone is barely audible and represents the minimum audibility curve. The upper curve gives for each frequency the intensity of the sound which is so loud that it produces a sensation of feeling and becomes painful and represents the maximum audibility curve. The points at which these two curves intersect give the lower and upper frequency limits of audibility. These curves are useful for making measurements of hearing defects and in computing the percentage of hearing or the percentage of hearing loss of a person having defective hearing.

As shown by the audiogram, the sound intensity giving the lower threshold of hearing, varies unequally in opposite directions while the frequency range is swept from one to the other end, dropping, as the frequency is increased from its lower end, by about 90 decibels to a minimum, and again rising by about 90 decibels as the frequency is increased to the upper limit of the audible frequency range. The curves marked 20 to 80 give the intensity of the sound at the different frequencies which are 20, 40, 60 and 80 decibels, respectively above the lower threshold of normal hearing, each curve giving the sound intensity which produces sound of the same hearing sensation level above the threshold of hearing throughout the audible frequency range.

As shown in Fig. 2, the useful range of hearing at each frequency may be expressed in terms of the number of decibels between the threshold of hearing and the threshold of feeling. The frequency range which is important for hearing and in which the range of hearing sensitivity is greatest lies between about 100 and 8000 cycles. In the mid portion of this frequency range between about 500 and 2000 cycles the range of hearing sensitivity is a maximum, amounting to about 130 db. above the threshold of hearing. In the lower and higher parts of the frequency spectrum, the range of the hearing sensitivity goes down, being only about 150 db. at 256 and 4096 cycles, and only about 90 db. at 128 and 8192 cycles.

For determining the hearing impairment of a deafened person, a satisfactory audiometer should be able to measure 80% of the loss of hearing in the principal audible frequency range between about 100 and 8000 cycles. In addition, a good audiometer should be able to impress at each frequency within the testing range a substantially pure tone, and the intensity of the tone should be accurately measurable. A change in sound intensity by one decibel is just about the minimum change detectable by the human ear. However, on account of the uncertainty of judgment of an average individual, one decibel change in sound intensity is of no great significance and an audiometer able to make measurements of the hearing sensitivity within about plus or minus 3 decibels is satisfactory.

Although audiometers capable of producing pure tones in frequency steps that are an octave apart in the range between about 100 and 8000 cycles meet many needs, there are many conditions requiring audiometers with a continuously variable frequency range. For instance, audiometers having a continuously variable frequency make it possible to detect peculiarities in the hearing of an individual at points which lie between the fixed frequencies which audiometers with fixed frequency steps would not detect.

Figure 1:
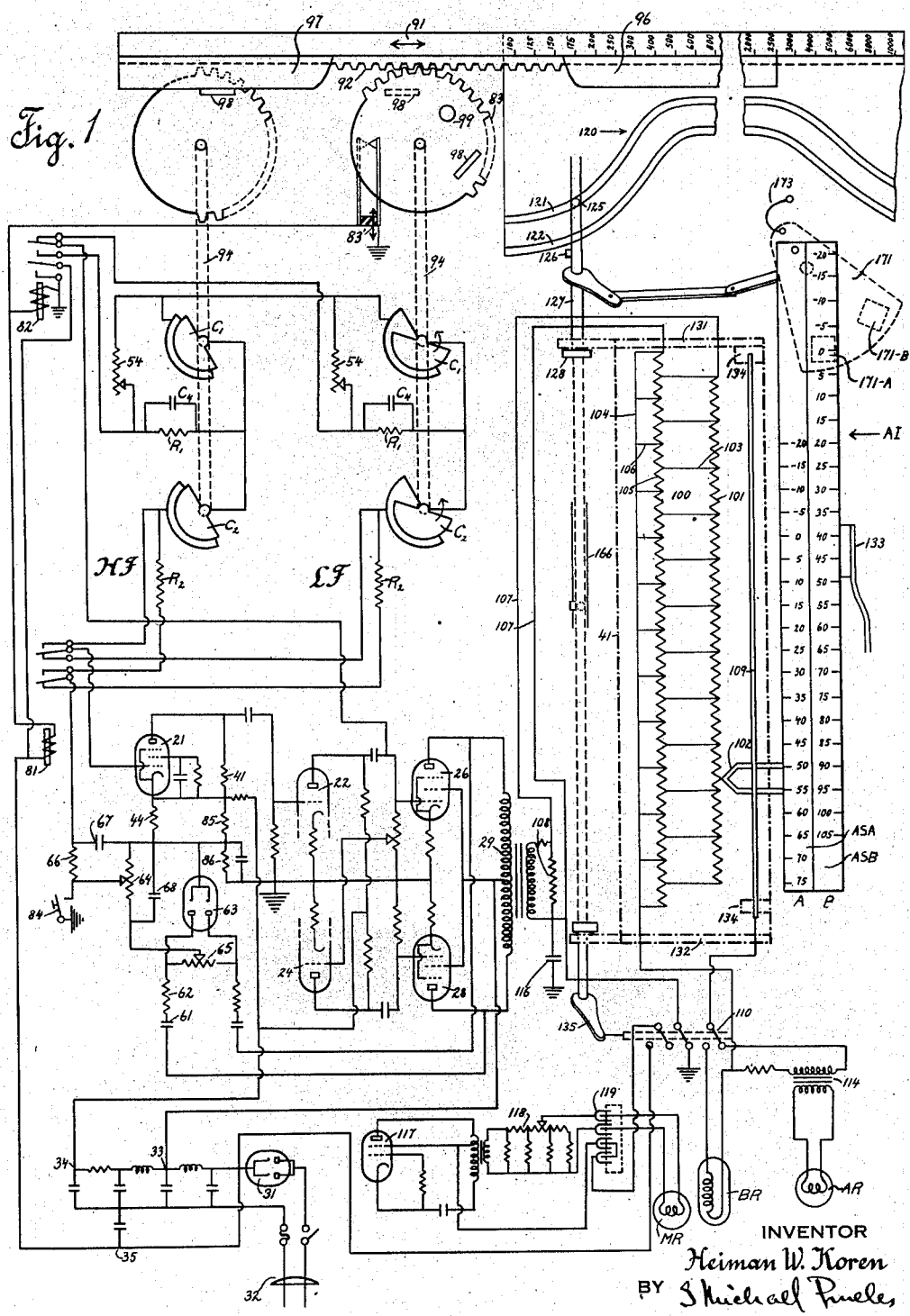

Fig. 1 is a diagrammatic illustration of a novel audiometer exemplifying one practical embodiment of the invention. Although an oscillator arrangement of the invention of the type described in connection with Fig. 1 using only a single feed back network with resistors and variable condensers is sufficient for producing oscillations continuously variable over the entire audio-frequency range important for practical audiometers, there are various applications in which it is desirable to extend the range of the frequency obtainable with a single feed back network of such character and accordingly, the audiometer arrangement is shown provided with two feed back networks which are automatically switched into the oscillation amplifier circuit as the frequency is varied from one part of the frequency range to the other.

It comprises an oscillation generator utilizing the amplifier tubes 21, 22, 24, 26, 28 for generating the oscillations which are supplied through an attenuator 100 and the associated circuits to a receiver through which sound is impressed on the hearing organs. The oscillation generator shown is designed in accordance with the principles disclosed and claimed in my copending application Serial No. 395,927, filed May 31, 1941, as a continuation-in-part of the present application.

The oscillations are produced by electron amplifier tube units 21, 22 and a feed back network LF or 23 interconnected between their input and output sides, and the generated oscillations are impressed by the two push-pull connected amplifier tube units 22, 24 on the two push-pull connected amplifier tube units 26, 27 forming the power amplifier stage which delivers the oscillations to an output transformer 29, the secondary winding of which is connected to a load.

In the form shown, the amplifier is designed to be energized from a conventional power supply system comprising, for instance, a rectifier 31 and a filter network formed of choke coils, resistors and condensers interconnected so as to deliver from an A. C. or D. C. 110-volt domestic supply line, indicated by the plug 32, a filtered positive plate or anode voltage at the terminal +33 to the power amplifier stage, and at the terminal +34 to the preceding amplifier stages. The cathodes of the several tube units are indirectly heated by heater filaments not shown, which are likewise supplied through plug 32.

The first oscillation amplifier tube unit 21 operates as a high gain amplifier and is shown in the form of a pentode having its anode connected through a coupling resistance 41 and a current adjusting resistor 42 to the positive supply terminal +34, its screen grid being maintained at the required positive operating potential through a resistance 43, interconnected between the resistances 41, 42 and its cathode being connected through a self-biasing resistor 44 to the low potential or grounded side of the amplifier indicated by a lead G, suitably connected by-pass condensers completing the circuits.

The output of the first amplifier tube is impressed through a blocking condenser 46 on the input grid of tube unit 22 which is connected through a grid resistor 47 to ground. The tube unit 22 operates as a phase inverter and is shown in the form of a triode which impresses on its output coupling resistor 48 a voltage which is in phase with the voltage impressed on the input grid of the first amplifier tube 21.

The voltage developed across the coupling resistance 48 of the triode 22 is impressed through a blocking condenser 51 and a feed back lead 52 including a serially connected resistance 53 upon the entrance terminals of either feed back network LF or the feed back network HF, the outgoing terminals of which are connected between the input grid and the low potential or grounded side of the first amplifier tube 21.

Each feed back network is formed of a first network section consisting of a series resistance R1 and a shunt condenser C1 and a second network section consisting of a series condenser C2 and a shunt condenser R2.

An adjustable-tap resistor 54 is connected across the entrance terminals of each feed back network 23 to form a voltage divider, enabling accurate adjustment of the component of the output voltage impressed on the entrance terminals of the feed back network.

Sustained oscillations will be generated by such arrangement at the frequency $F_0$ given by:

$$F_0 = \frac{1}{2\pi\sqrt{R_1 R_2 C_1 C_2}} \qquad (1)$$

In such arrangement, with the first tube 21 operating as an oscillation amplifier which shifts the input voltage 180°, and the second tube unit 22 as a phase inverter having an output voltage which is in phase with the input voltage of the first tube unit 21, each section of the feed back network will produce only at the frequency $F_0$ given by Equation 1 an overall phase shift zero, and feed back to the input grid of the first tube 21 a voltage which is in phase with its grid input voltage of tube 21, and bring about the generation of oscillations of the desired frequency if the amplifier has an overall gain sufficient to cover the losses in the feed back network 23, and in the other circuit elements associated with the oscillating circuit.

The condensers C4 are connected in shunt to the feed back resistors R1, and are effective in increasing the range over which the frequency of the oscillations may be continuously varied by the rotary condensers C1, C2 with a single set of feed back resistors in the way disclosed in my aforesaid application.

A practical oscillator actually constructed in the way indicated in Fig. 1 with a feed back network using variable condenser C1, C2 having a maximum capacity of $730\times10^{-12}$ farad and requiring three different sets of feed back resistors interchangeably switched into the feed back circuits for covering in three steps the ranges from 12 to 200 cycles, from 200 to 2,000 cycles, and from 2,000 to 20,000 cycles, on being modified in accordance with the invention by combining with it a negatively acting condenser C4 of $100\times10^{-12}$ farad connected in shunt to the feed back resistor R1, and using the same set of resistors R1, R2, enables an increase of the frequency range over which the frequency was continuously variable by 100 times with only a single set of such feed back resistors.

In the form of the oscillator arrangement shown in Fig. 1, the triode 22 which serves as a phase invertor element in the oscillation generating circuit is utilized also to cooperate with the associated triode 24 as a push-pull exciting stage for driving the push-pull amplifier stage with its power amplifier tubes 26, 28. The cathodes of the two triodes 22, 24 are connected in their push-pull circuit through balancing self-biasing resistors, and their two anodes are connected in the push-pull circuit across two coupling resistors 44, the high potential points of which are connected through similar blocking condensers 51 to the high potential points of the push-pull connected grid resistors 56 of the power amplifier tubes 26, 28, the cathodes of which are likewise connected in their push-pull circuit through self-biasing resistors.

A tap on the grid input resistor of the power amplifier tube 26 supplies the exciting voltage for the push-pull invertor triode 24 and enables accurate adjustment of the exciting voltage so that it will be equal and 180° out of phase relative to the voltage across the input grid of the triode 22.

To assure frequency stability and a pure wave form that is free from distortion, the oscillation generating amplifier is controlled in any known way by automatically controlling its gain so as to operate the oscillation amplifier as a class A amplifier, restricting the oscillations to the linear part of the tube characteristics and by applying a suitable amount of negative feed back.

In the arrangement of Fig. 1, the self-biasing resistor 44 has no shunting by-pass condenser and is connected in series with the cathode of the oscillation amplifier tube 21 in such relation to the resistor 41 of its anode circuit as to apply to its grid a negative feed back voltage sufficient to reduce distortion, but insufficient to stop oscillations. The cathode resistor 44 may be used to automatically control the gain of the amplifier tube by making it in the form of an incandescent lamp filament arranged to operate at a temperature at which its resistance rises with the current so as to automatically vary the grid bias of the amplifier tube 21 and maintain its operation in the linear part of its characteristic at a gain which is just sufficient to supply the losses in the feed back network and the other parts of the oscillator circuit and produce the desired sustained oscillations.

In the audiometer of Fig. 1, the amplifier tube units 21, 22, 24, 26, 28 are connected to produce oscillations when either the feed back network LF or the feed back network HF is connected by the two relays 81, 82 between the output side of the amplifier triode 22 and the input side of the amplifier tube 21.

The parameters of the feed back network LF are chosen to produce oscillations variable over a lower part of the frequency range and the parameters of the feed back network HF are chosen to produce oscillations variable over a higher part of the frequency range. The component of the feed back voltage applied to the input side of each feed back network is adjusted by a variable tap resistor 54 and linear operation of the oscillation generating amplifier over the frequency range is assured by the automatic control of the bias of the grid of the amplifier tube 21 through a rectifier arrangement including a rectifier 63.

The relays 81, 82 are of the direct current type and have their coils connected in series between ground and a positive terminal 35 which is connected through a filter network including an inductance, a current limiting resistor, and a condenser to the rectifier 31 of the power supply system. When the relay 81 is energized, as in the position shown in Fig. 1, its two sets of downwardly flexed contacts connect the input grid of the amplifier tube 21 and the lead from the adjustable tap of the rectifier resistor 64 to the terminals of the resistor R2 forming the outgoing terminals of the feed back network LF, the corresponding terminals of the other feed back network HF being connected to the tube circuits in the released normally biased position of the contacts of relay 81.

When the other relay 82 is deenergized, as in the condition shown in Fig. 1, its upper released contacts complete the feed back connection between resistor 53 and the entrance terminal of the feed back resistor R1 of the feed back network LF, the corresponding terminal of the other feed back network HF being similarly interconnected when the relay 82 is energized.

In the position shown in Fig. 1, the relay 82 is held deenergized by completing at the closed contacts of an auxiliary switch 83 a short circuit around its actuating coil, the switch 83 being so arranged that when it opens and restores the energization of the relay 82, the latter completes at its lower flexible contacts a short circuit for the coil of the other relay 81, thereby releasing its two sets of contacts to their normally biased unflexed position.

In other words, when the auxiliary switch 83 is closed and completes its circuit, the energizing relay 81 and the deenergizing relay 82 connect the feed back network LF in the oscillator circuit, and when the switch 83 is opened, thereby energizing relay 82 and deenergizing relay 81, the two relays disconnect the feed back network LF and connect instead the feed back network HF in the oscillator circuit.

The frequency of the generated oscillations is continuously varied over a large continuously variable frequency range made possible by the use of several of such phase-shifting or controlling networks LF, HF by a frequency selector or control arrangement 90 which is so designed that by a continuous movement of a single frequency selector such as member 91, the generated oscillations are continuously varied from one end of the desired frequency range to its other end.

In the form shown diagrammatically in Fig. 1, the frequency selector 91 has a driving gear 92 which, in the position shown, drives a condenser gear 93 mounted on a common shaft 94 with the rotors of the variable condensers C1, C2 of the feed back network LF, so that movement of the frequency selector 91 to the left actuates the condensers C1, C2 to continuously increase their capacity thereby raising the frequency of the generated oscillations.

The length of the selector gear 92 is so proportioned that when, in the form shown, its leftward motion brings the condensers C1, C2 of the feed back network LF to their position of minimum capacitive coupling, the left end of the selector gear 92 is brought into engagement with a similar condenser driving gear 95 which rotates through a common shaft 94 the variable condensers C1, C2 of the feed back network HF so as to vary them in a similar way in the course of the further motion of the frequency selector 91 while the right end of its gear 92 leaves its driving engagement with the condenser driving gear 93 the feed back network LF.

The frequency selector 91 is also provided with two condenser locking cam sections 96, 97 adjoining the ends of its driving gear 92 and arranged so that locking cam section 96 maintains locking engagement with a locking projection 98 of condenser gear 95 of the network HF in order to keep its variable condenser C. C. locked in the same operating position as long as the selector gear 92 rotates the variable condensers C1, C2 of the other network LF and that the frequency selector gear 92 in the course of its leftward motion reaches the position in which it disengages from the condenser gear 93 of the network LF and engages the condenser gear 95 of the other network HF the locking projection 98 of its condenser gear 95 is released by locking cam section 96 of the frequency selector 91, and its other locking cam section 97 establishes a similar locking engagement with a similar locking projection 98 of the condenser gear 93 of the network LF in order to keep its variable condensers C1, C2 locked in the same operating positions as long as selector gear 92 rotates the variable condensers C1, C2 of the feed back network HF.

In other words, the frequency selector 91 is so arranged that during a short transition portion of its motion when it breaks the driving connection to the variable condensers of one feed back network and establishes its driving connection with the variable condensers of the adjacent feed back network, it remains in driving engagement with the variable condensers of both feed back networks, thus providing a period of transition during which the frequency controlling elements of both feed back networks are varied, the feed back networks being so designed that their ranges overlap and merge during the period of transition.

Provision is also made to assure that during the transition period of the frequency selector 91 as it leaves its coupling engagement with the control element of one feed back network and establishes its coupling engagement with the control element of the succeeding feed back network, the switching relays 81, 82 are automatically actuated to disconnect one feed back network from the oscillator circuit at the moment during when the two feed back networks are in a condition at which they generate oscillations of the same frequency.

In the form shown, such automatic action is obtained by utilizing the condenser gear 93 to keep the contacts of the control switch 83 of the relays 81, 82 closed as long as the condenser gear 93 is being rotated, and to open the contacts of the switch 83 only at the point when, during the transition period, the contacts of the switch 83 are brought into engagement with an interrupter member 99 operated by condenser gear 93.

In the practical construction of such control arrangement, the condenser gear 93 is made in the form of a metal disc, of brass, for instance, and the contacts of the switch 83 are biased to press on the opposite sides of the gear so that its circuit is kept closed as long as the contacts of switch 83 ride on the metallic surfaces of the condenser gear 93. The interrupter member 99 of the gear 93 is made in the form of an insulating insert extending through the wall of the gear so that when the front end of the insulating interrupter insert 99, in the course of its anti-clockwise rotation starts to enter between the contacts of the control switch 83 and opens the switch circuit thereby actuating the relays 81, 82 to disconnect the feed back network LF and connect the feed back network HF into the oscillator circuit.

This switching occurs at the moment of the transition period while the frequency selector gear 92 is in driving engagement with condenser gears 93, 95 of both feed back networks LF, HF, the driving engagement of the frequency selector 9 with the condenser gear 93 being broken when the points of the switch contacts 83 reach an intermediate portion of the insulating interrupter insert 99, this being the position when the condenser locking section 97 establishes its locking engagement with the locking projection 98 of condenser gear 93, as indicated by their dotted line positions 98', 99', respectively.

In other words, in the frequency selector arrangement described above, the frequency selector 91 with its various elements are so arranged that as the frequency selector 91 is moved from the position shown toward the left, it will continue to rotate the condenser gear 93 of the frequency selector LF until, at the point when its condensers C1, C2 are about to reach their position of minimum capacity, the driving gear 92 of the frequency selector also establishes driving engagement with the condenser gear 95 of the feed back network HF; and that during the transition period of the further movement of the frequency selector 91 toward the left, while both condenser gears 93, 95 are rotated, a point is reached at which the relay control switch 83 is opened at the moment when both feed back networks are in a condition in which they will generate the same frequency, the switching operation of the relays connecting at that moment the feed back network HF in lieu of feed back network LF into the oscillator circuit; and that when, at the end of the transition period of the motion of the frequency selector 91 its gear releases the condenser gear 93 of the network LF and locks it by its locking cam 97, the insulating interrupter insert 99 of the gear 93 will hold the relay control switch 83 open and keep the feed back network HF connected in the oscillator circuit, as long as the frequency selector 91 rotates the condensers C1, C2 of the network HF for varying the frequency over the other range; and that on the reversal of the movement of the frequency selector 91 from its utmost left-hand position, a similar sequence of operations is performed in reverse order.

Simple continuous variable control of the generated frequency, as indicated by the frequency index on the frequency scale over a larger range than possible with a single feed back network, is thus made possible by a very simple and foolproof mechanism.

In order to assure that the frequency generated by the two feed back networks LF, HF at the moment of transition is identical, small trimming condensers or trimming resistors may combine with the feed back networks. The moment at which the relay control switch 83 is actuated from the closed to the open position for cutting out one feed back network and interconnecting the other into the oscillator circuit may be adjusted by an adjustable mounting of the switch 83, so that it may be shifted in the direction indicated by the arrow 83' and locked in the adjusted position, corresponding to the position when the frequency generated by the two feed back networks are identical. The adjustable resistors 54 connected to the entrance terminals of the two feed back networks make it possible to adjust their operation to assure that at the moment of transition from one feed back network to the other, not only the frequency of the generated oscillations shall be identical, but that the oscillations impressed on the output transformer shall be of the same intensity.

By an arrangement of the type described above, a simple motion imparted to the frequency selector 91, from the low frequency end of its scale to the high frequency end of its scale as indicated on its index will actuate the oscillator circuits to generate the oscillations varying over the large frequency range made possible by the use of two or more feed back networks covering successive parts of the desired frequency spectrum which are automatically switched into the oscillating circuit as the frequency is varied.

The oscillations of the different frequencies are delivered to an attenuator associated with attenuation dial 21.

Attenuators for making audiometric measurements have to be so designed as to enable attenuation of the electric output delivered to the receiver in terms of a logarithmic scale expressed as the hearing loss in decibels above the lower threshold of hearing of a normal person.

In the form shown, the attenuator 100 comprises a wire-wound resistor pad 101 arranged to be engaged by a relatively movable slider contact 102 in the way generally used in the known volume controls, and an adjacently mounted second wire-wound resistor pad 105 and a bus conductor 104. A plurality of spaced points along the resistor pad 101 are electrically connected by jumpers 103 to a plurality of equally spaced points on the resistor pad 105 and the mid points of the consecutive resistor sections of the resistor pad 105 are interconnected by jumpers 106 to the bus conductor 104. If the resistor pads 101, 103 are uniformly wound, the consecutive resistor sections of the rheostat pad 101 represent the line resistance of a logarithmic attenuator and two adjacent resistor sections of the resistor 103, which connect each jumper 105 to the bus conductor 104, act as leak resistors and represent the elements of the distributed leakage resistance along the line. Two wire resistor pads, interconnected by jumpers and having a slider contact on one pad will give as accurate attenuation as the cumbersome prior art wire-wound attenuators, and the error occurring when the slider contact 102 engages a point of the resistor pad 105 between adjacent jumper taps can be kept down to as small a fraction of a decibel as desired. Thus in the specific exemplification of the invention shown as applied to an audiometer attenuator, an attenuation range of 125 decibels is secured by using a rheostat pad 101 having a total resistance of 1780 ohms and a resistor pad 105 of 4600 ohms, and interconnecting the resistance pad 101 at twelve equally spaced points with the resistor pad 103 and connecting 24 equally spaced points of the resistor pad 103 to the bus conductor 104, and continuous logarithmically uniform attenuation with an error much smaller than 1 db. is secured by moving the sliding contact 102 along the rheostat pad 101.

The attenuator scales ASA, ASB, for air conduction or bone conduction are arranged to indicate, for each attenuator setting, the intensity of the sound produced by the receiver AR, BR respectively in terms of decibels hearing loss above the intensity of sound which produces a barely audible sound, i. e., above the sound intensity of the lower threshold of hearing as indicated in the lower curve of Fig. 2 which indicates, for each frequency, the point of zero sensation level for the air-conduction attenuation scale ASA. In the form shown, the slider contact on 102 is affixed to the attenuator scale AS and the attenuation index AI is in a fixed position so as to indicate on the attenuation scale the attenuation for the different positions of the slider contact 102 relatively to the resistor pad 101 of the attenuator.

In the arrangement shown, the input side of the attenuator network is connected through leads 107 to the secondary winding of the output transformer 29 of the oscillator, a terminal resistor 108 connected across the input terminals of the attenuator serving to match the load impedance of the attenuator network with the output circuit of the amplifier.

The bus conductor 104 and the rod or lead 109 on which the slider contact 102 of the attenuator rides deliver the attenuated output, the degree of attenuation being indicated by an attenuator index shown in the form of an arrow marked AI on an attenuator scale AS. The audiometer shown in Fig. 1 is intended for operation either with an air conduction receiver AR or a bone conduction receiver BR and the attenuator scale AS has two scales ASA, ASB for the air conduction and bone conduction receiver, respectively.

A multiblade changeover switch 110 connects, in the shown right-hand position of its right blade, the attenuator output leads 104, 109, by way of an impedance matching transformer 114 and a serially connected condenser to the air-conduction receiver AR, the bone conduction receiver BR being connected directly to the attenuator output leads 104, 109 in the other position of the switch blade. In order to prevent the flow of capacity currents from the attenuator network to the receiver, one side of the attenuator, namely the connection of its bus lead to a low potential end of the secondary winding of the output transformer 29 is connected to ground through the middle blade of the changeover switch 110.

When the bone conduction receiver BR is directly connected to the attenuator output leads 104, 109, a direct connection of one side of the receiver to ground would result in the flow of capacitive currents from the primary to the secondary winding of the output transformer. This is avoided by using the middle blade of the changeover switch 110 to disconnect the ground from the secondary transformer winding and establish through a small condenser 116 of about .02 microfarad, for instance, the required by-pass to ground.

When bone conduction hearing measurements are made, a masking noise has to be impressed on the better ear of the person under test. A relaxation oscillator formed of a gaseous conduction tube 117 and the associated circuits is used as a source of noise currents which are impressed through an output transformer and an auxiliary attenuator 118 on an air conduction receiver MR, which supplies the masking noise.

The cathode of the oscillation generator tube 119 is supplied from the power supply plugs 32 and its plate circuit is energized from a positive lead of the power system rectifier 31 by way of a circuit which is completed by a jumper extending between plug terminal contacts of a plug member 119 which is used to connect the masking receiver MR, to the attenuator 118, so that only when the masking receiver is plugged in by its plug 119 will the relaxation oscillator 119 be set into operation to supply noise currents to the masking receiver MR.

Since the effectiveness of an audiometer as a measuring instrument depends on the accurate determination of the intensity of the acoustic output delivered by the receiver to the hearing organ of the individual under test, it is essential that the attenuation of the acoustic output of the receiver is actually varied in accordance with the indications on the attenuator scale. To meet the foregoing requirement, the best audiometers available prior to the invention had to resort to complicated attenuation scale arrangements because, as shown in Fig. 2, the sound intensity giving the lower threshold of hearing, and representing the zero hearing level on the attenuation scale, varies unequally in opposite directions while the frequency is varied from one end of its scale to its other end, dropping by about 90 decibels to a minimum as the frequency is increased from the lower limit of the audible frequency range to about 2000 cycles per second, and rising again by about 90 decibels above the minimum as the frequency is further increased to the upper limit of the audible frequency range. Furthermore, the efficiency or sensitivity of the available receivers differs greatly over the frequency range of audible hearing, being usually a maximum at about a thousand cycles, and falling off at lower and higher frequencies. In addition, it is also necessary to compensate for any variations in the oscillator output at different frequencies.

In making audiometric measurements, it is also desirable to be able to sweep through the entire audible frequency range while impressing at all frequencies the sound intensity producing the same sensation level on the tested ear organ. The available receivers which are used for audiometric measurements, while able to produce the sound intensity corresponding to the highest sensation levels indicated on the audiometric scale in the range between 500 and 2500 cycles, are not able to produce such sound intensity in the low and high audiofrequency ranges. This is due to the fact that even the best available air conduction receivers have very little sensitivity in the low frequency range below about 500 cycles and have also substantially reduced sensitivity in the high frequency range above about 4000 cycles.

Since a satisfactory audiometer should be able to measure 80% of the hearing loss of a person in the principal audible frequency range between about 100 and 8000 cycles, this means that the minimum output of the receiver must be about 100 db. above the lower threshold of normal hearing in the range of about 1000 cycles where the hearing range is a maximum and that the attenuator should be able to indicate such loss. If an audiometer would be designed to deliver a receiver output of 100 db. above the threshold of hearing throughout the frequency range between about 100 cycles to 8000 cycles, it would require not only an oscillation generator of abnormally large output capacity, but also abnormally powerful receivers able to deliver such output in the low frequency range between 100 and 400 cycles. However, the best available air conduction receivers could not be made to operate satisfactorily with such high power output; and even if they were made to operate with such large output they could readily get out of adjustment and their response characteristics would undergo changes each time they were subjected to such abnormal load conditions.

Accordingly, a satisfactory audiometer should enable the testing of the hearing loss up to at least 100 db. in the range between of about 500 and 2500 cycles, and at the same time, it must render it impossible to make on the attenuator a reading corresponding to a sound intensity which the receiver is unable to deliver at the given frequency setting, such as 125 cycles, at which commercially practical receivers are able to deliver only about 75 db. above the threshold of normal hearing. In other words, an attenuator designed to measure 100 db. hearing loss at 1000 cycles, should render it impossible to make inaccurate measurement of the hearing loss in the frequency ranges, such as at 125 cycles at which the hearing sensitivity of the normal ear is much poorer and the maximum loss that has to be measured, namely about 75 db., does not exceed the output which commercial receiver is able to deliver at such frequency. All prior commercially available audiometers resorted to dials having several scales in order to meet the most essential requirements, and could not be used for sweeping the frequency range without disturbing the accuracy of the attenuator readings.

According to the invention, the difficulties connected with complicated attenuator scale arrangements of prior audiometers are eliminated, and an audiometer operating with a single attenuation scale and indicator is made possible, by interlinking the oscillator frequency control means and the attenuator control means so as to unequally modify in opposite directions the magnitude of the oscillations supplied by the oscillator to the receiver at the different frequencies and thereby compensate for irregular variations of the sound energy giving zero hearing level as well as any other irregularities occurring in the operation of the audiometer while the frequency of the oscillations is varied from one end to the other end of the frequency scale.

In the audiometer of Fig. 1 embodying one form of the invention, the attenuator is combined in a special way with the frequency selector mechanism so that all the required compensation and the correlation of the settings of the attenuator to the different settings of the frequency selector are obtained without the use of special compensating resistors, while rendering it possible to sweep through the frequency range settings with an attenuator arrangement which makes it possible to extend the range of the hearing loss that can be measured with a single scale up to the maximum output which the receiver is able to deliver at the frequencies at which the ear sensitivity is great, without disturbing the correct indication of the attenuation in the frequency ranges in which the hearing sensitivity is smaller, and the maximum sound intensity which the receiver is able to deliver is sufficient to measure the smaller hearing loss in the range of smaller hearing sensitivity.

In the arrangement of the invention, the attenuator is so combined with the frequency selector that if the frequency selector is swept through the frequency scale, the receiver will deliver the output corresponding to a given attenuation setting as long as the receiver is able to deliver the required sound intensity; and that as soon as the frequency selector is moved to a frequency setting at which the receiver is not able to deliver the sound intensity indicated on the attenuation scale, the attenuator is automatically brought to a setting corresponding to the maximum sound intensity which the receiver is able to deliver at the given frequencies as indicated on the frequency scale.

In other words, by the arrangement of the invention, the frequency selector means and the attenuation regulating means are so correlated that the sound intensity delivered by the receiver remains at the sensation level indicated on the attenuation scale as long as the generated frequency is varied throughout the frequency range at which the receiver is able to deliver the sound intensity corresponding to the given attenuator setting as indicated on its scale, while assuring that if the frequency selector is moved into a part of the frequency range at which the receiver is not able to deliver the sound intensity indicated on the attenuation scale at the given attenuation setting, the attenuator is automatically adjusted to give and indicate the correct lower sensation level in the different parts of the frequency range while rendering it impossible to impart to the attenuator a setting corresponding to a greater sound intensity than the receiver is able to deliver at the given frequency setting to which the frequency selector has been swept or adjusted.

One form of arrangement for securing such automatic correlation of the frequency selector means and the attenuator arrangement is shown diagrammatically in Fig. 1. The movable frequency selector member 91 is provided with an attenuation control cam member or cam plate 120 on which are formed two attenuation controlling cam track grooves 121, 122 which move with the frequency selector 91. An attenuator 100 has two resistor pads 101, 103 which are mounted on a movable support 124, indicated by dash-dotted lines, for movement relatively to the slider contact 102, while maintaining at all times engagement therewith.

The attenuator control cam track 121 is engaged by a cam follower pin 125 of a slidably mounted rod 127 which engages through a collar 128 a projection 129 from the attenuator support 124, so that when the cam follower rod 127 is moved to different positions by the transverse movement of the cam track 121, the attenuator support with its resistor pad 101 is moved relatively to the slider contact 102. The cam follower rod 127 and the attenuator support 124 are suitably guided so as to keep the attenuator in the proper operative position while the cam track 121 actuates the rod 127 and therethrough the attenuator support 124 with the attenuator pad to different positions of engagement with the slider contact 102 as the frequency selector 91 is moved over its frequency range as indicated on the frequency scale.

In order to maintain the selected attenuator setting as indicated on its scale AS by the index AI, while the attenuator support 124 is moved by the frequency selector cam 120, there is provided a suitable braking means shown in the form of a braking pad 131 pressed by a spring against the attenuator scale AS which is affixed to the attenuator slider contact 102 and moves therewith relatively to the attenuator index AI. This arrangement assures that, normally, the motion imparted by the frequency selector cam 120 to the attenuator support 124 does not disturb the attenuator slider contact 102 and the attenuator setting, as indicated on its scale ASB.

In order to show in Fig. 1 how the cam tracks 121, 122 operate to render it impossible to make inaccurate measurements of the hearing loss in the frequency ranges below 600 cycles and above 2500 cycles in which the receiver is not able to deliver the sound intensity required to measure a 100 db. loss, a part of the frequency selector 91 with the associate scale and cam surface portions between 800 and 2000 cycles is broken away.

The cam follower rod 127 is mounted so that it may be turned as by an arm 135 through an angle of 90° so as to release the follower pin 125 from the cam track 121 and to bring engagement of a similar cam follower pin 126 with the other cam track 122, when tests by a bone conduction receiver are to be made, or vice versa.

The arm 135 of the cam follower rod 127 is also used to actuate the changeover switch 110 from the position in which the air conduction receiver AR is connected to the attenuator to the position in which the bone conduction receiver BR is connected to the attenuator, and vice versa, these positions corresponding to the engagement of the cam follower pin 125 with the cam track 121 or cam follower pin 126 with the cam track 122, respectively.

The cam track 121 for measuring hearing with the air conduction receiver AR is so designed and shaped that for each frequency setting of the frequency selector 20, as indicated on the frequency selector scale FS, the attenuators support 124 as actuated by the cam follower rod 127 to automatically shift the attenuator pad 101 relatively to the slider contact 102 to a position in which the electric output delivered to the air conduction receiver AR gives a sound output which produces a sensation level of hearing indicated on the attenuator scale ASA, and to automatically assure compensation for the relative variations in the sensitivity of the receiver and the variations of the oscillatory output delivered at each particular frequency.

The cam tracks 121, 122 are so designed that for each frequency, the attenuation index AI shall indicate on the attenuation scale AS zero hearing loss corresponding to the lower threshold of hearing of a normal person, such as indicated by the lower curve in Fig. 5. Thus, if, for instance, the cam track 121 for the air conduction receiver is to be designed, one may proceed as follows:

The air conduction receiver is applied to the ear of a person having normal hearing in a silent room and the frequency selector is set for one frequency, while the attenuator scale is set for zero. Thereupon, the attenuator support 124 is shifted relatively to the slider contact 102 until the normally hearing person signifies that he barely hears the tone. The position of the attenuator support relatively to the cam plate 120 at the particular frequency gives one point of the cam track 121 corresponding to the zero setting of the attenuator scale at the given frequency.

By proceeding in a similar way for all other frequencies, a cam track for the entire frequency range is determined. In making such calibration, a number of individuals having good hearing are tested, and the average curve for a number of persons is used as the final calibration curve for the cam track 121.

In a similar way, the cam track 122 for the bone conduction receiver BR is calibrated.

In order to show in Fig. 1 the principal characteristics of the attenuation controlling cam tracks 121, 122, used in practical audiometers of the invention, the intermediate portion of the frequency scale FS between about 600 cycles and 2500 cycles, in which very little compensation for the variations in the receiver sensitivity and other variables is required, is shown broken away, the broken away cam track portions being substantially even.

In order to prevent making of erroneous readings on the attenuation scales ASA, ASB, provision is made to assure that only in one position of the frequency selector 91 can the audiometer operation be changed from measuring with the air conduction receiver AR on the attenuator scale ASA to measuring with bone conduction receiver AB on the attenuation scale ASB, and vice versa. In the arrangement shown in Fig. 1, this is secured by confining one of two guide pins 125', 126', extending from the cam rod 127 in alignment with its corresponding cam follower pins 125, 126, respectively, within a guide channel 129 so as to permit turning of the cam rod 127 only when the frequency selector 91 is brought to the position of the lowest frequency in which both guide pins 125', 126' of the cam rod 127 are released from the guide channel, and the cam rod may be turned 90° to bring either its cam pin 125 into engagement with cam track 121 or its cam pin 126 into engagement with cam track 122.

The audiometer arrangement described above assures that at each frequency setting as indicated on the frequency scale, the single scale and single index of the attenuator gives a correct indication of the hearing loss and that on sweeping through the frequency range, at a given setting of the attenuator, the sound delivered by the receiver is at the same sensation level throughout the frequency range, as indicated on the attenuation scale, as long as the attenuator loss setting is low enough to enable the receiver to deliver the sound intensity corresponding to the indication on the attenuation scale, at all frequencies swept through on the frequency scale.

Provision is also made to prevent disturbance of the attenuation indication if the frequency selector is swept through the frequency range while the attenuation loss setting is higher than that corresponding to the sound which the receiver is able to deliver in parts of the swept frequency range.

In the form of the audiometer shown in Fig. 1, the attenuation by index AI, indicated on the attenuation scale AS, may be adjusted by shifting the slider contact 102, which serves as the attenuation regulator, along the resistor pad, a brake pad 131 being pressed, as by a spring, against the support of the attenuation scale AS which forms part of the attenuation regulator.

The motion of the attenuator contact slider 102 with is attenuation scale AS relatively to the attenuator support 124 is limited by two stops 134, extending from the attenuator support 124 adjacent the ends of the main resistor pad 101.

The stops 134 are positioned and arranged relatively to the slider contact 102 and the resistor pad 101 as to prevent inaccurate adjustment of the attenuator and to assure that the attenuation settings are always accurately indicated on the scale, even if the frequency selector is moved, from a frequency setting, such as 1000 cycles at which the attenuator was adjusted to measure a big hearing loss such as 100 db., toward a marginal frequency setting, such as 175 cycles, at which the receiver cannot deliver a sound intensity corresponding to the high attenuator setting at the original frequency setting. In other words, the stops 134 are so positioned and arranged as to prevent bringing of the attenuator to a setting higher than that corresponding to the maximum sound intensity which the receiver is able to deliver at any given frequency setting, the slider contact 102 of the attenuator being automatically engaged by one or the other of the attenuator stops 134, 137 and prevented from being brought to a position of incorrect attenuation setting or incorrect attenuation indication.

If an audiometer arranged in the way described above is used for making measurements with the air conduction receiver AR, with the attenuator set for a hearing loss of 20 decibels, indicated by its index AI at 20 on its scale ASA, and the frequency selector is swept at the same hearing sensation level of 20 decibels above the threshold of hearing, as indicated in Fig. 2 by the curve marked 20, the attenuation support will be automatically shifted to attenuate the oscillatory current delivered to the receiver to a greater degree in the range below 400 cycles and above 3000 cycles, to compensate for the varying sensitivity of the receiver and the other factors which vary with the frequency, for instance, in the way indicated by the curved parts of the cam track 121 in the parts of the frequency range below 500 cycles and above 2500 cycles, and the intermediate substantially even part of the cam track between about 500 and 2500 cycles. Let it also be assumed that the dash line curve ML in Fig. 2 represents the maximum sensation level which the receiver AR is able to deliver at the different frequencies when energized by the maximum available oscillator power.

In a similar way, if the attenuator is set for zero sensation level, as indicated at zero on its attenuation scale ASA, and the frequency selector 91 is actuated to sweep throughout the frequency range, it will move the attenuation support so that at each frequency, the electric output delivered to the receiver through the attenuator network will produce in the receiver a sound intensity indicated by the lower curve threshold of audibility of Fig. 2, this being the sensation level zero on the attenuation scale ASA. On the other hand, if the attenuation is set for a sensation level 80 and the frequency selector 91 is swept, for instance, from the frequency setting of 2000 cycles down toward the lower end of the frequency range, the cam track 121 will shift the attenuator support so as to deliver the receiver oscillatory currents which produce a sound intensity corresponding to a hearing sensation level of 80 db., following curve 80 in Fig. 2 until its crossing point ML 80 with curve ML is reached, at which the slider contact 102 of the attenuator engages one of its stops 134, so that in the course of the further sweeping motion of the frequency selector 91 its cam track 121 drags the attenuator support 124 with its resistor pad 101 as well as the contact slider 102 with its attenuation scale, against the braking action of its braking pad 131, so as to indicate on the attenuation scale ASA the correct reduced sensation level of hearing along curve ML, from point ML80 down to the lower end of the frequency range, corresponding to the smaller sound intensity which can be produced and measured at such lower part of the frequency range.

Similarly, if the attenuation level is raised, by moving the attenuation contact slider 102 with its scale AS, while the frequency selector 91 is in a setting such as 128 cycles, one of the attenuator stops 134 will come into play to prevent an incorrect adjustment of the attenuator, to a setting higher than that corresponding to the output which the receiver is able to deliver at the given frequency setting. In other words, as long as the frequency selector or attenuation regulator is adjusted to settings, at which the test receiver is able to deliver the sound intensity corresponding to the indicated settings, changing the frequency settings throughout the frequency range will not disturb the attenuator setting, and changing the attenuator setting will not disturb the frequency setting. However, if a change in a frequency setting into a part of the frequency range in which the receiver is unable to produce the sensation level indicated on the attenuation scale, one of the stops 134 of the attenuation will come into play and prevent the frequency selector from being moved into the marginal frequency scale regions without at the same time dragging the attenuation support to a position corresponding to the lower sensation level available at such frequency settings.

This arrangement makes it possible to regulate the attenuation so that the sound output delivered by the receiver is at the same sensation level throughout the frequency range available for each distinct setting of the attenuation regulator. As the sensation level is increased above that available at the end frequencies, namely, the low frequency and the high frequency range, the stop of the attenuator comes into play to prevent the frequency selector from moving into the marginal frequency scale regions without dragging the attenuator body to a position corresponding to the lower sensation level available in such region as indicated on the attenuation scale.

In other words, the frequency selector means and the attenuation regulating means are so correlated that the sound intensity delivered by the receiver is always at the sensation level indicated on the attenuation scale as long as the generated frequency is varied throughout the frequency range available for each setting of the attenuator scale, while assuring that if the sensation level, as indicated on the attenuator scale, is increased above that which the receiver is able to deliver in the lower and higher frequency ranges, the attenuator regulating means are automatically actuated to prevent the frequency selector from moving into these regions without at the same time adjusting the attenuator to a lower sensation level setting corresponding to the maximum output which the receiver is able to deliver in such parts of the frequency range.

In the audiometer arrangement of the invention, the frequency selector is thus so combined with the attenuator, and the cam tracks which control the operation of the attenuator in accordance with the operation of the frequency selector are so arranged and shaped that for each frequency setting, the attenuator automatically brings the slider contact into engagement with a portion of its rheostat network to secure controlled attenuation of the oscillatory output supplied to the attenuator network required in order to produce in the receiver the sound output which gives the sensation level indicated on the attenuator scale, and thus assure compensation for the relative variations in the sensitivity of the receiver and of the oscillatory output delivered by the oscillation generator as well as any other variable factors at each particular frequency. The cam track which is operated by the frequency selector is so shaped and arranged that when the attenuator is moved to a setting corresponding to the maximum sound output that the receiver is able to deliver at the given frequency setting, one of the attenuator stops comes into play and prevents actuation of the attenuator to an incorrect setting.

Thus, if the frequency selector is moved to the 125 cycle setting, its cam track actuates the attenuator support to a position where its stop makes it impossible to adjust the attenuator to an attenuation setting corresponding to a sound output higher than that corresponding to the maximum output which the receiver is able to deliver at such low frequency. Similarly, for each other frequency setting, the stop of the attenuator support prevents the attenuator from being adjusted to a position, corresponding to an attenuation setting higher than the receiver is able to deliver at the given frequency setting. In order to maintain the attenuator setting as indicated on its scale while the attenuator support is actuated by the frequency selector, the attenuation regulator is provided with a brake arranged so that the motion imparted to the attenuator support does not normally affect the attenuator setting as indicated on the attenuator scales.

The principal structural features of a commercial form of audiometer embodying the principles of the invention described in connection with Fig. 1 will now be described. As shown in Figs. 3 to 6, a frequency selector or control shaft 136, carrying at its inner end the frequency selector plate 91, is rotatably mounted in a mounting wall 137, located behind a front panel 138 of the audiometer, and has secured to its front end a frequency control operating knob FC. A dial with the frequency scale FS is affixed to the frequency selector shaft 136 behind a window ESW of the front panel 138 through which a portion of the frequency scale is exposed, and a strip 139 of transparent material bearing the frequency index FI being placed immediately behind the window for indicating on the scale FS the different frequency settings.

The rotary condensers C1, C2 of the feed back networks LF, HF are mounted together with the other elements of the feed back networks in a shielded casing 140 of metal supported within a suitable audiometer housing, in the space extending behind the mounting wall 137, the shaft 94 of the rotary condensers of the low frequency network LF carrying on its outer end the gear 93 and shaft 94 of the rotary condensers of the feed back network HF carrying on its outer end the condenser gear 95.

Cheap commercially available rotary gang condensers and cheap gears 93, 95 are used. The gears 93, 95 are driven by the frequency selector member 91, shown as a circular disc made of a similar gear blank from which about half of the gears have been removed so as to provide thereon a gear segment 92 extending along about half of its periphery for driving either one of the condenser gears 93, 95 of the two feed back networks in a way analogous to that described in connection with Fig. 1.

In the form shown, the driving gear disc 91 and the two condenser gears 93, 95 are made of standard gear blanks having the same wall thickness. The teeth of the condenser gears 93, 95 are slightly offset relatively to the teeth of the driving gear segment 92 of the frequency selector disc 91, and the portion of its periphery which has no teeth has secured thereto a locking plate segment 141 arranged so that its perheral edge is aligned in overlapping relation to the teeth of the two condenser gears 93, 95 and serves as the locking cam sections 96, 97 for interlockingly engaging one of the two condenser gears 93, 95 while the other is rotated by the driving gear 92, except for the duration of the short transition period during which the driving gear segment 92 engages and drives both condenser gears 93, 95 in a way analogous to that explained in connection with Fig. 1.

The side wall portions of the condenser gears 93, 95 which are aligned in the plane of the locking cam sections 96, 97 of the locking segment 141 are provided with shallow depressions 142 arranged so that a tooth portion bordering one peripheral edge of the depression serves as the locking projection 98 which becomes engaged by the periphery of the locking segment 141 when one of the condenser gears 93, 95 is locked.

In the form shown in Figs. 4 to 6, the clockwise rotation of the frequency selector disc 91 imparts through its driving gear segment 92 a counterclockwise motion to the condenser gear 93 of the condenser rotor plates of the feed back network LF, rotating them counterclockwise from their inward to their outward position, while the peripheral edge of the locking plate 141 engages the overlapping tooth projection 98 of the gear 95 and holds it locked so that the condenser rotor plates of the high frequency feed back network HF are kept locked in their inward position in which the condensers have maximum capacity coupling.

Since standard commercially available rotary condensers are usually designed so that when their rotary plates are in the inward position, they can be rotated only in outward direction, the rotary condenser plates of the feed back network HF will remain locked in their inward position as long as the locking projection 98 of the condenser gear 95 is engaged by the locking segment 141 of the frequency selector disc 91 and is prevented from turning in outward counterclockwise direction.

Shortly before the counterclockwise rotation of condenser gear 93 brings its rotary condenser plates to the end of their outward path, the locking projection 98 of the gear 95 is released from its locking engagement with the peripheral locking segment portion 97 of the frequency selector 91 and the adjoining teeth of the driving gear segment 92 come into engagement with the teeth of the gear segment 95 so that during the short transition period, until the condenser rotor plates driven by gear 93 reach the end of their outward path, the rotary condenser plates of both feed back networks will be rotated by the driving gear 92 of the frequency selector disc 91.

At the end of the transition period, in the course of the rotation of the frequency selector disc 91, its peripheral locking segment portion 96 comes into engagement with the locking teeth projection 98 of the condenser gear 93, and locks it and the rotary condenser plates of the low frequency network LF against counterclockwise rotation, a stop projection 143 mounted in the path of a stop pin 144 extending, for instance, from the hub of the condenser gear 93 preventing counterclockwise rotation thereof. As a result, during the further clockwise rotation of the frequency selector disc 91, the condenser rotor plates of the low frequency feed back network LF remain locked in their outward position, while the frequency selector gear 92 rotates through condenser gear 95 the rotary condenser plates of the high frequency network from their inward toward their outward position.

In an analogous way, counterclockwise rotation of the frequency selector 91 will return first the condenser rotor plates of the high frequency network HF that are connected to the condenser gear 95 from their outward position to their inward position and after locking them in their inward position, at the end of the transition period, the further counterclockwise rotation of the frequency selector disc 91 returns the rotary condenser plates of the low frequency network from their outward to their inward position.

As shown in Fig. 6, the condenser gear 93 of the low frequency feed back network is provided with the insulating insert 99 for controlling the operation of a spring contact switch 83 which operates the relays in the way described in connection with Fig. 1.

The rotational movement of the driving gear 92 is limited by a stop pin 146 extending from its body and engaging in its end positions either the right or the left side of a stop 147 suitably mounted in the path of the stop pin 146.

As shown in Figs. 3, 4 and 8 to 10, an attenuator control or regulating shaft 152 carrying on an insulating support 153 secured to its inner end, the contact slider 102 of the attenuator is rotatably mounted in the mounting wall 137 of the audiometer and has secured to its outer end projecting through the front panel 138 an attenuator control knob AT similar to the frequency selector knob FC. A dial plate provided with the attenuation scales AS is secured to the attenuator control shaft 152 so as to expose through a window ASW in the front panel 138 a portion of the attenuation scale AS, a plate of transparent material 153 carrying an attenuation index marked AI in front of the exposed portion of the attenuation scale AS so as to indicate the setting of the attenuator.

Figure 8:
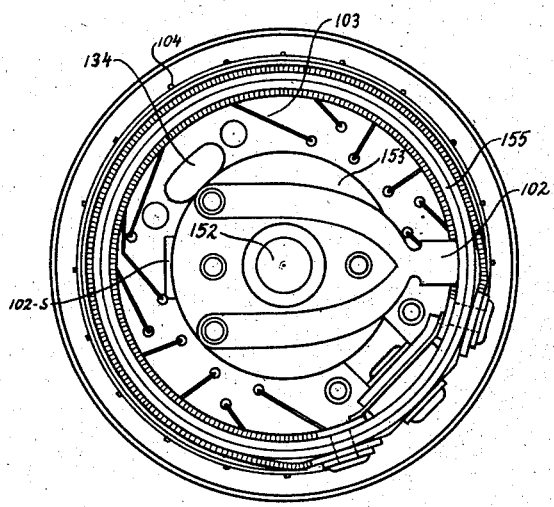
Fig. 8 is a cross-sectional view along line 8—8 of Fig. 7 illustrating the interior of the attenuator mechanism.
Figure 9:
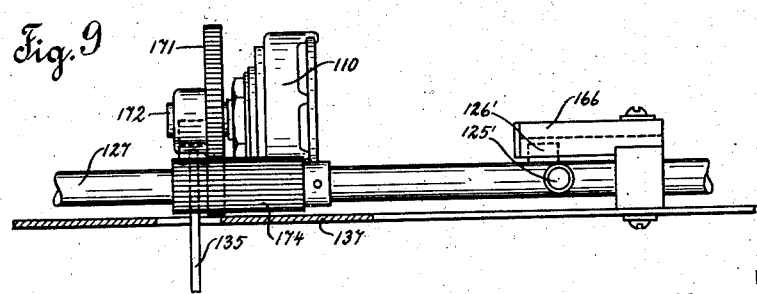
Fig. 9 is a plan view of some of the elements of the mechanism shown in Fig. 4.

As shown in Figs. 8 and 9, a circular metallic housing which forms the attenuator support 124 is revolvably mounted on attenuator control shaft 152 which carries the slider contact 102, the front side of the attenuator support housing 124 being provided with a collar 153 on which is mounted a gear 154 by means of which the attenuator housing 124 with its attenuator support 124 may be independently turned relatively to the control shaft 152 and the slider contact 102 carried thereon.

Figure 7:
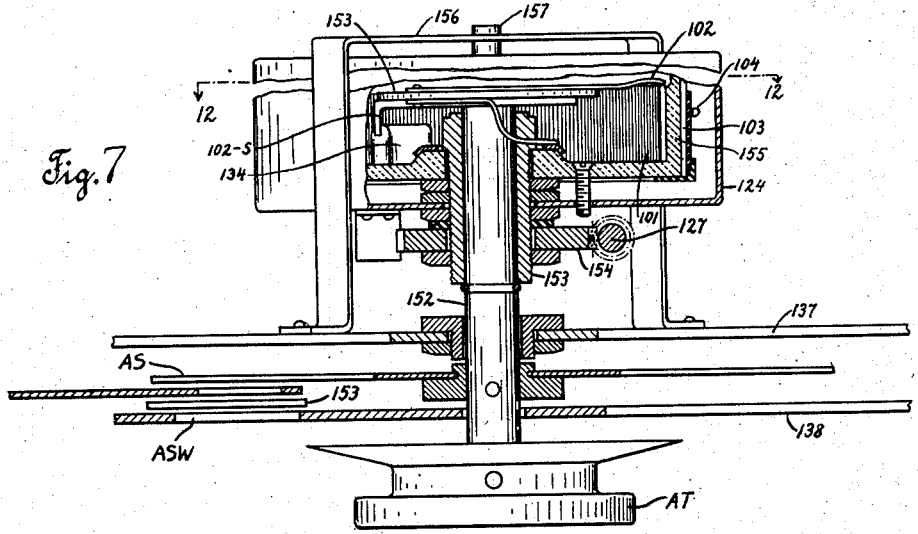
Fig. 7 is a cross-sectional view along line 7—7 of Fig. 3.

On a suitable cup shaped insulating support 155 affixed to the interior of the attenuator housing 125 are mounted two circularly bent wirewound resistor pads 101, 103 so that when the attenuator housing 124 is rotated relatively to this attenuator control shaft 152, the slider contact 102 is brought into engagement with the different portions of the exposed contact surfaces of the resistor wires forming the resistor pad 101. As shown in Figs. 7 and 8, the jumpers 103 passing through holes in the bottom wall of the insulating cup 155 interconnect equally spaced taps of the resistor pads 101 and 103 supported thereon, and similar jumpers interconnect taps on the exterior resistor pad 103 to the bus conductor 104 strung over an insulating collar placed around the outer resistor pad 103. The stop 134 of the attenuator supporting housing is formed by a projection from the insulating cup 155 and is located in the path of a stop projection 102—S extending from the slider contact support 153 so that when in the course of the rotation of the attenuator housing, its stop 134 engages the stop 102—S of the slider contact 102, the further rotary motion imparted to the attenuator housing 124 will also drag with it the sliding contact 102 as well as its control shaft 152 and the attenuation scale AS. An additional support for the attenuator housing 124 while it revolves relatively to the attenuator control shaft 152 is provided by a bracket 156 suitably secured to the mounting wall 137 and having at its center a journaling hole serving as a journaling support for a pin 157 extending from the rear of the attenuator casing 124.

As shown in Fig. 4, the operation of the frequency selector shaft 91 and the operation of the attenuator with its attenuator support 124 are correlated, by affixing to the frequency selector shaft 91 a circular cam plate 120 having two cam tracks 121, 122 for air conduction and bone conduction measurements, respectively, arranged to be engaged with either one or the other of follower pins 125, 126 of the cam follower rod 127 carrying a driving worm 161 engaging the gear 154 on the attenuator support so that the rotation of the frequency selector shaft 91 with its cam plate 120 will impart through one or the other of its cam tracks 121, 122 and the cam follower rod 127 a corresponding rotary displacement of the attenuator housing 124 with its resistor pad 101 relatively to the contact slider 102 in a way analogous to that described in connection with the diagrammatic showing of the corresponding parts in Fig. 1.

As shown in Figs. 4 and 10, the cam follower rod 127 has a circular cross-section and is guided longitudinally by supporting brackets 164, suitably secured to the rear of the mounting panel 140. The cam follower rod 127 may be turned by 90° within its guide brackets 164 so as to bring its cam follower pins 125, 126 into engagement with either one of the cam tracks 121, track 122, respectively, depending on whether hearing by air conduction or bone conduction is to be measured.

Provision is also made to assure that only in one position of the frequency selector 91 is it possible for the audiometer to be changed from air conduction testing to bone conduction testing. To this end, one of two guide pins 125', 126', projecting from the cam follower rod 127 in alignment with its corresponding cam follower pins 125, 126, respectively, is guided within a guide channel of a guide channel member 166 extending from one of the cam follower brackets 164 so that as long as one of the guide pins 125', 126' is confined within the guide channel 166, the cam rod 127 cannot be turned from one operating position to the other.

The guide channel 166, in which one or the other of the guide pins 125', 126' of the cam rod 127 is confined during its longitudinal movement, is made long enough so as to release the confined guide pin when the cam rod 127 is in the position of its maximum displacement in the direction toward the frequency selector shaft 91 corresponding to a setting of the frequency selector at which the change to other type of testing should be made.

In the form of arrangement shown, the changeover from measuring hearing by air conduction to bone conduction and vice versa can be made only when the frequency selector 91 is in the position of its lowest frequency settings in which position the confined guide pin of the cam follower rod 127 is released from engagement with the guide channel member 166, and the cam follower rod 127 may be turned 90° for changing to the other type of measuring hearing.

The limited changeover motion from air conduction to bone conduction testing or vice versa is imparted to the cam follower rod 127 by an operating lever 135 which is secured to a gear member 171 mounted on the shaft 172 of a switching unit 110 suitably secured as by a bracket to the rear side of the mounting wall 137 of the attenuator, the teeth of the gear 171 meshing with an elongated pinion 174 slidingly keyed to the cam follower rod 127 so as to maintain engagement with the gear 171 in all its longitudinal positions.

The switching unit 110 has the various contacts shown diagrammatically in Fig. 1, which are operated when the lever 135 is moved to the air conduction or bone conduction positions, its gear 171 imparting at the same time through the pinion 174 a 90° turning motion to the cam follower rod 127 for releasing one and engaging the other of its cam pins 125, 126 with the corresponding cam track of cam plate 126.

In order to assure that only one of the two hearing loss scales ASA, ASB of the attenuator are exposed behind the attenuator index AI, depending on whether hearing by air conduction or bone conduction is measured, a masking plate 176 located behind the attenuation index AI and provided with two windows 176—A, 176—B is suitably pivoted at 177 and biased by a toggle spring 177 so as to be movable between two end positions for exposing through one of its windows a portion of the air conduction scale ASA or a portion of the bone conduction scale ASB.

The changeover lever 135 is suitably coupled to the masking plate 171, for instance, by engaging a hole formed in it, so that when the changeover switch 110 and the cam follower rod 127 are moved from the bone conduction position to the air conduction position or vice versa, the masking plate 171 is automatically tilted to the position in which it exposes behind the attenuation index AI either a portion of the air conduction scale only or a portion of the bone conduction scale only.

It will be noted that, as shown in Figs. 1 and 4, the cam tracks 121, 122 which are utilized for correlating the operation of the frequency selector and the attenuation regulator are of irregular character. This is due to the fact that the factors which require correlation vary with the frequency in a very irregular manner and do not conform to any regular law or function.

In Fig. 10 is shown a modified arrangement of audiometer exemplifying in another form some of the principles of the invention explained in connection with Fig. 1.

It comprises an oscillation generator tube 212; two push-pull connected amplifier tubes 216; and a network of inductances, condensers and associated elements for enabling selective generation of the required pure tone frequencies. The tubes are energized from a conventional 110-volts electric supply line 220 through a power pack 221 which is connected to the supply line by a power switch 222. The power pack 221 comprises a rectifier 223, a filter choke 224, and two filter condensers 225 connected in shunt to the grounded lead of the filter. A meter 226 and rheostat 227 enables accurate adjustment of the direct current voltage delivered at the positive filter terminal +B, to assure proper operation of the oscillation generator. The four heaters of the cathode 211 are shown energized through a parallel supply circuit including a rheostat 228, a signal light 229 and a pilot light 230.

The plate 214 of the oscillator tube 212 is connected through a choke coil 231 of the B+ terminal of the power pack, and its cathode 213 is connected in series with a self-biasing resistor 232 to the ground, a by-pass condenser 233 being connected parallel to the resistor 232. The plates of the amplifier tubes 216 are connected in push-pull to the primary winding of an output transformer 235, the mid-point of which is connected through a lead 236 to the plate supply terminal +B, and the cathodes of the amplifier tubes 216 are connected through a resistor 237 to ground.

The oscillation generator is designed to operate with fixed tuned circuits for producing pure tone oscillations of the different frequencies important in making audiometric tests, namely, the frequencies separated by an octave in the range between 128 to 8192 cycles per second. To this end, the oscillator tube 210 is arranged to selectively cooperate with two tuning inductances L1, L2, a bank of tuning condensers C1 to C7, and a bank of feed-back resistors R1 to R7, as vertically aligned with the corresponding tuning condensers with which they are selectively interconnected to the oscillator tube for producing the oscillations of the different frequencies. A bank of multi-blade contact-spring switches, designated by the numerals 128 to 8192 corresponding to the different frequencies, each switch having a set of contact blades SO, SA, shown as arrows, vertically aligned with the corresponding tuning condensers C1 to C7, and feed-back resistors R1 to R7, serve to interconnect the selected combination of tuning inductance, tuning condenser, feed-back resistors into the tuned oscillating circuits required to generate the different frequencies. To complete an oscillating circuit for a given frequenccy, for instance, for 1024 cycles, the end blade E of the switch 1024 is flexed to actuate its other aligned contact blades to the closed position, thereby establishing the following operating circuits:

From the plate 14 of the oscillator tube by way of lead 241 including blocking condenser 242 to the feed-back resistor R4, by way of the aligned closed blade contacts of selector switch 1024 to the tuned circuit formed of the condenser C4 and the inductance L2 which is connected by leads 243, 244 to the condenser C4, continuing from the other side of the tuned circuit C4, L2, by way of the closed contact blades and lead 245 to the control grid 215 of the oscillator tube 212, the grounded mid-point of the inductance L2 completing the plate circuit of the oscillator tube 212 and the feed-back circuit to the control grid 215 of the oscillator tube 212, the feed-back resistor R4 being adjusted to secure pure sinusoidal oscillations of 1024 cycles fixed by the tuned circuit. In addition, the closed contacts of the selector switch 1024 connect the opposite sides of the tuned circuits C4, L2 by way of leads 246, 248 to the control grids 215 of the two push-pull connected amplifier tubes 216, so as to deliver amplified 1024 cycle oscillations to the output transformer 235.

In a similar way, oscillations of each of the other testing frequencies may be selectively generated and delivered to the output transformer 235 by actuating the end spring E of any one of the other selector switches 128, 256 ... 8192 from the normally open position to the closed position in the way described above in connection with the oscillating circuit for the 1024 frequency.

The oscillator arrangement described above is distinguished by a number of important characteristics. In designing an oscillator arrangement for producing the required pure sinusoidal tones of frequencies differing by three to four octaves of the principal audible frequency range, practical considerations make it necessary to limit to a minimum the inductances required for the different tuned resonant circuits corresponding to the different generated frequencies. In the audiometer of the invention, only two tuning inductances L1, L2 are used to produce the different pure tone oscillations in the frequency range between 128 cycles and 8192 cycles. Each inductance must thus serve with a series of different condensers as a tuned tank circuit of resonant frequencies, differing from each other by three octaves. As a result, the impedance of the tank circuit, formed by the inductance in combination with the different condensers greatly increases as the frequency increases. Such large tank impedances require, in turn, very large feed-back resistors to prevent distortion of the oscillations, and such large feed-back resistors must be accurately adjusted so as to be free from spurious effects that would interfere with the proper operation of the oscillation circuits. In the oscillator arrangement of the invention, these difficulties are overcome, by providing for each tuned tank circuit a shunting resistance, formed of the two resistors 249 arranged to be connected in parallel to the tuned circuits of the different frequencies so as to limit the maximum impedance across the tank circuit to a value of about 100,000 ohms. This, in turn, makes it possible to use moderate size feed-back resistors R1 to R7, assuring stable generation of the oscillations of the different frequencies.

By using the different tuned tank circuits required to generate the oscillations of the different frequencies as a coupling impedance to the push-pull amplifier, the tank acts as a very effective filter for harmonics that might produce distortion. By this arrangement, the oscillatory voltage which is impressed by the oscillator on the control grids of the push-pull amplifier has a very pure wave form and the push-pull amplifier is able to deliver oscillations of great purity.

In order to actuate the oscillation generator to selectively generate the desired frequencies, the frequency selector 210 is made in the form of a movable member having, for instance, a cam nose 280 which may be moved into selective engagement with the end blade E of any one of the selector switches so as to flex its associated contact blades from the normally open position to the closed position, in which the oscillator circuits of the selected frequency are established so as to generate and deliver to the output transformer 235 the desired frequency, as explained above for the 1024 frequency setting.

The oscillations of the different frequencies are delivered to an attenuator 260 connected to the secondary winding of the output transformer 35. The attenuator comprises a plurality of series resistances 261 and a plurality of shunt resistances 262 connected between the series resistances 261 and a conductor 263 to form a ladder network provided with taps 264 so that the electric output delivered to the ladder network is logarithmically attenuated, each tap 264 increasing the attenuation by 5 db.

The different degrees of attenuation are adjusted or regulated by moving a sliding contact 265 from tap to tap by means of the attenuation regulator 211 which has a dial scale 266 with the different degrees of attenuation, so as to indicate by an index 267 on the scale 266 the hearing loss in decibels corresponding to the output delivered by the attenuator network at the tap 264 engaged by the sliding contact 265, the attenuation regulator 211 being movable in the direction of the arrows, and back, to bring the sliding contact into contact engagement with any one of the taps 264 of the attenuator network.

An air conduction receiver 270 and a bone conduction receiver 271 are arranged to be connected between the attenuator lead 263 and a switch 272 which is connected through lead 273 to sliding contact 265 to enable energization of either one of the receivers with the attenuated oscillatory output to produce sound energy of the frequency determined by the frequency selector 210, and of an intensity level determined by the attenuation regulator 211.

There is also provided an arrangement, which correlates the operation of the frequency selector with the attenuation regulator and the control of the intensity of the sound delivered by the receiver to assure proper operation of the audiometer. It comprises a plurality of shunting resistances A1 to A7 and B1 to B7 interconnected to a lead 275 that is connected to the lead 263 from one end of the secondary winding of the output transformer 235. The other ends of the resistors A1 to A7 and B1 to B7 are arranged to be selectively connected by the contact blades SA of the selector switches 128 ... 8192 to leads 276, 277 which, in turn, are arranged to be connected by switch 278 to the lead 279 extending from the other end of the secondary winding of the output transformer 235. The switch 278 is operated conjointly with switch 272 which controls the connections of the air conduction receiver or bone conduction receiver 271 to the attenuator so that lead 276, which completes the connection to the resistors A1 to A7, is connected to the output transformer 235 when the air conduction receiver 270 is energized, and lead 277, which completes the connection to the resistors B1 to B7, is connected to the output transformer 235 when the bone conduction receiver 271 is energized.

With this arrangement, each setting of the frequency selector automatically connects one of the equalizing resistors A1 to A7 or one of the equalizing resistors B1 to B7 in shunt to the secondary winding of the output transformer 235 while the bone conduction or air conduction receiver, respectively, is energized by the attenuator. The individual resistors A1 to A7 are adjusted to make the electric output delivered by the output transformer 235 to the attenuator such that for each of the different testing frequencies, the attenuator scale gives an accurate indication of the sound intensity delivered by the air conduction receiver in terms of the hearing loss. Similarly, the individual resistors B1 to B7 are adjusted to equalize the electric output delivered by output transformer 235 to the attenuator so that for each of the different testing frequencies, the attenuator scale gives an accurate indication of the sound intensity delivered by the bone conduction receiver.

The function of the equalizing resistors A1 to A7 and B1 to B7 is to reduce the intensity of the oscillations delivered to the input side of the attenuator and thus compensate for the differences of the sensitivity of the receiver and also for variations in the characteristics of the oscillator at the different frequencies of the audiometer range. Obviously, such resistance, or, in general, any impedance-type equalizing network effects equalization of electrical output energy only by reducing the maximum output. In other words, the electrical output delivered by the oscillation generator must be at least as large as the maximum output required by the receiver under its most unfavorable operating conditions.

To assure that for each setting of the attenuator, the intensity of the sound delivered by the receiver is accurately indicated on the attenuator while the setting of the frequency selector is changed over the frequency range, the operation of the frequency selector is automatically correlated with the attenuation scale arrangement to assure that if the frequency selector is shifted, from a position in the mid-frequency range between about 400 to 2500 cycles in which the receiver is able to deliver a 100 db. output to a position in marginal frequency ranges in which the receiver is unable to deliver the maximum output of the 100 db. sound intensity, the attenuation index on the attenuator scale is automatically brought to a position which makes it impossible to make on the attenuation scale a reading indicating a sound intensity greater than that which the receiver is able to deliver.

The frequency selector 210 has a cam member 280 arranged to cooperate with a cam follower 281 which holds the attenuation scale index 267. The cam follower 281 is shown guided in sleeves 282 and is urged by a biasing spring 283 against the cam surface of the cam member 280 so as to slide thereon and be brought into engagement with different portions of the cam surface while the frequency selector is moved to the different positions indicated by the frequency index 252 on the frequency scale 251.

In the form shown, the cam surface of the cam 280 is so arranged that as long as the frequency setting of the frequency selector remains within the mid-frequency range, the index 267 is retained by the cam follower 281 in a fixed position so as to indicate on the audiometer the maximum extent of the attenuation required to determine a hearing loss of 80% in this frequency range, that is up to 100 db.

To this end, the cam member 80 is provided with a cam surface portion 285 which is so correlated to the frequency scale 251 and the frequency indicator 252, that as long as the frequency selector is set to generate a frequency within the range at which the receiver is able to deliver 100 db. above the threshold of hearing, for instance, between about 500 and 2000 cycles, the cam follower 281 with its attenuator index 267 will remain fixed in the position at which the attenuator scale is able to indicate the maximum hearing loss shown on its scale, in the case illustrated, 100 db.; and that as soon as the frequency selector 210 is moved to a position where its index indicates on the frequency scale a frequency at which the receiver is not able to deliver sound intensity corresponding to a 100 db. hearing loss, such as at a frequency between 200 to 350 and between 3000 to 5000 cycles, the cam follower 281 is brought into engagement with the cam surface portions 286, 287, respectively, thereby shifting the attenuation index to a position in which the attenuator scale can indicate only the maximum output that the receiver is able to actually deliver at such marginal frequencies, in the case illustrated, 90 db. hearing loss on the attenuation scale 266; and that on moving the selector to a marginal frequency range below 200 cycles or above 5000 cycles at which the receiver is unable to deliver 90 db., the follower 281 is brought into engagement with the cam surface portions 288, 289 so as to shift the attenuation index 267 to a position in which it makes it impossible for the attenuator to be regulated to indicate a hearing loss corresponding to a sound intensity greater than the receiver is able to deliver in the frequency range corresponding to the setting of the frequency selector, in the case illustrated, 75 db. hearing loss.

The several cam surface elements 285 to 289 are so arranged that, as the frequency selector is moved to the different frequency settings indicated on the frequency dial, the cam follower 281 which fixes the position of the attenuation index, or, in general, controls the attenuation scale arrangement, automatically moves from its engagement with one cam surface portion into engagement with another cam surface portion corresponding to the different frequency range settings of the frequency selector. Obviously, depending on the sensitivity of the receiver in the different frequency ranges and depending on the maximum output that the receiver is able to deliver at the different frequency ranges, the different cam surface portions may be arranged to permit the operation of the attenuator to indicate the maximum output that the receiver can deliver at the given frequency.

It is likewise obvious that if the audiometer of the type described above were required to explore a maximum loss of hearing of 75 db. above the normal threshold of hearing throughout the entire frequency range between 100 and 8000 cycles, the cam surface of the cam member 280 would be designed to keep the index 267 at all times in a fixed position where the maximum attenuation that can be indicated on the attenuator is not more than the maximum receiver output at the frequency of its lowest sensitivity, for instance, only 75 db. so as to make it impossible to make erroneous audiometric measurements.

In order to facilitate the making of audiometric measurements, the audiometer is also provided with a tone interrupter arrangement which enables momentary interruption of a tone without producing a click or any other noise that might mislead the individual who is being tested.

The interrupter arrangement comprises an interrupter switch 291, which is normally in its back contact position and a resistor 292 connected in series with the lead which applies the operating bias to the screen grids 217 of the amplifier tubes 216 so as to maintain them at their normal operating potential. When the interrupter switch 291 is actuated from the position shown to the front contact position, it opens the connection of the screen grids 217 to the positive bias terminal +B and connects the screen grids to the ground and to a shunting condenser 293 which in the normally closed position of switch 291 is maintained fully charged to the normal screen grid potential. As a result, actuation of the interrupter switch 291, to disconnect the screen grids 215 from the +B potential, does not instantaneously apply the ground potential to the screen grids, but the condenser 293 which is fully charged to the screen grid potential only gradually discharges across the resistance 292, thereby gradually reducing the bias of the screen grids 215 so that the tone dies away slowly without causing any clicks or other masking noises that would disturb the individual under test and affect the results of his tests. Restoration of the tone, by returning the interrupter switch 291 to the back contact position shown, does not suddenly apply the full screen potential to the screen grids 217, because during the initial period while the condenser 293 is being recharged, the potential applied to the screen gradually rises and the level of the tone gradually rises without producing any disturbing masking noises or clicks.

The switch controlled signal light 229 makes it possible for the person under test to indicate the moment when he ceases to hear the sound. The energizing circuit of lamp 229 is provided with a signal switch which is manually operated by the person under test who is usually instructed to release and press the switch when he hears and ceases to hear, respectively.

In order to make it possible to converse with a deafened person who is undergoing a test, the push-pull amplifier associated with the tubes 216 for amplifying the test oscillations may be also utilized to amplify speech directed to the person under test. To this end, a microphone 294 and a multi-blade control switch 295 may be arranged to connect the microphone through the input transformer 296 so as to impress the control grids 215 of the two amplifier tubes 216 the speech current transmitted by the transmitter 294 when the switch 295 is moved from the normal position shown in Fig. 3 to the position in which the microphone 294 is connected to the secondary winding of the transformer 296 and the control grids of the amplifier tubes 216 are disconnected from their normal operating circuits and connected to the secondary winding of the transformer 296. The primary winding of the transformer 296 is shown connected by means of a network including a choke coil 297 and a condenser 298 connected across the resistor 237 so as to supply to the transmitter microphone 294 a D. C. exciting current.

The distinct novel features of the oscillator arrangements and attenuator arrangements disclosed above in connection with the description of measuring and testing arrangements exemplifying the features of invention claimed herein, do not form the subject matter of the present application and are claimed in my copending application Serial No. 395,927, filed May 31, 1941, as a continuation in part of the present application.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

1. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative in a predetermined manner to unequally modify in opposite directions the magnitude of the oscillations supplied to the receiver at different frequencies.

2. In an apparatus for measuring hearing or the like, the combination of: an electric oscillation source element including frequency control means having a frequency scale and at least one movable part operatively arranged for adjusting the frequency of the oscillations over a predetermined frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative in a predetermined manner to unequally modify in opposite directions the magnitude of the oscillations supplied to the receiver at different frequencies for preventing throughout the range of said frequency scale disturbance of the adjustment of one of said control means as indicated on its scale by an adjustment of the other of said control means as indicated on its scale; said one of said control means having a single scale and a single index cooperating therewith.

3. In an apparatus for measuring hearing, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative in a predetermined manner to unequally modify in opposite directions the magnitude of the oscillations supplied to the receiver at different frequencies.

4. In an apparatus for measuring hearing, the combination of: an electric oscillation source element including frequency control means having a frequency scale and at least one movable part operatively arranged for adjusting the frequency of the oscillations over a predetermined frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative in a predetermined manner to unequally modify in opposite directions the magnitude of the oscillations supplied to the receiver at different frequencies for preventing throughout the range of said frequency scale disturbance of the adjustment of one of said control means as indicated on its scale by an adjustment of the other of said control means as indicated on its scale; said one of said control means having a single scale and a single index cooperating therewith.

5. In an apparatus for measuring hearing or the like, the combination of: an electric oscillation source element including relatively movable frequency control means having a frequency scale operatively arranged for adjusting the frequency of the oscillations over a predetermined continuous frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies.

6. In an apparatus for measuring hearing or the like, the combination of: an electric oscillation source element including frequency control means having a frequency scale and at least one movable part operatively arranged for adjusting the frequency of the oscillations over a predetermined continuous frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means as indicated on its scale by an adjustment of the other of said control means as indicated on its scale; said one of said control means having a single scale and a single index cooperating therewith.

7. In an apparatus for measuring hearing, the combination of: an electric oscillation source element including relatively movable frequency control means having a frequency scale operatively arranged for adjusting the frequency of the oscillations over a predetermined continuous frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies.

8. In an apparatus for measuring hearing, the combination of: an electric oscillation source element including frequency control means having a frequency scale and at least one movable part operatively arranged for adjusting the frequency of the oscillations over a predetermined continuous frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means as indicated on its scale by an adjustment of the other of said control means as indicated on its scale; said one of said control means having a singe scale and a single index cooperating therewith.

9. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a correlated limited portion of its scale and to operate said interlocking means in response to an adjustment of said one of said control means for effecting a predetermined adjustment of the other of said control means to a predetermined indication within a correlated limited portion of its scale when its indication is outside thereof.

10. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined limited portion of its scale without disturbing the adjustment of the other of said control means as indicated on its scale when it is adjusted to an indication within a predetermined wide range of its scale and to operate said interlocking means in response to an adjustment of said one of said control means to an indication other than within a correlated limited portion of its scale for effecting a predetermined adjustment of the other of said control means to a predetermined indication within a correlated limited portion of its scale if it is outside thereof.

11. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a predetermined limited portion of its scale and to cause said interlocking means to prevent adjustment of said other of said control means to an indication other than within a correlated limited portion of its scale when said one of said control means is adjusted to an indication outside a correlated limited portion of its scale.

12. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a correlated limited portion of its scale and to operate said interlocking means in response to an adjustment of said one of said control means for effecting a predetermined adjustment of the other of said control means to a predetermined indication within a correlated limited portion of its scale when its indication is outside thereof; said other of said control means having a single scale and a single index cooperating therewith.

13. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined limited portion of its scale without disturbing the adjustment of the other of said control means as indicated on its scale when it is adjusted to an indication within a predetermined wide range of its scale and to operate said interlocking means in response to an adjustment of said one of said control means to an indication other than within a correlated limited portion of its scale for effecting a predetermined adjustment of the other of said control means to a predetermined indication within a correlated limited portion of its scale if it is outside thereof; said other of said control means having a single scale and a single index cooperating therewith.

14. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a predetermined limited portion of its scale and to cause said interlocking means to prevent adjustment of said other of said control means to an indication other than within a correlated limited portion of its scale when said one of said control means is adjusted to an indication outside a correlated limited portion of its scale; said other of said control means having a single scale and a single index cooperating therewith.

15. In an apparatus for measuring hearing or the like, the combination of: an electric oscillation source element including frequency control means having a frequency scale and at least one movable part operatively arranged for adjusting the frequency of the oscillations over a predetermined frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of said attenuation control means as indicated on its scale by an adjustment of said frequency control means as indicated on its scale; said attenuation control means having a single scale and a single index cooperating therewith.

16. In an apparatus for measuring hearing, the combination of: an electric oscillation source element including frequency control means having a frequency scale and at least one movable part operatively arranged for adjusting the frequency of the oscillations over a predetermined frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of said attenuation control means as indicated on its scale by an adjustment of said frequency control means as indicated on its scale; said attenuation control means having a single scale and a single index cooperating therewith.

17. In an apparatus for measuring hearing or the like, the combination of: an electric oscillation source element including frequency control means having a frequency scale and at least one movable part operatively arranged for adjusting the frequency of the oscillations over a predetermined continuous frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of said attenuation control means as indicated on its scale by an adjustment of said frequency control means as indicated on its scale; said attenuation control means having a single scale and a single index cooperating therewith.

18. In an apparatus for measuring hearing, the combination of: an electric oscillation source element including frequency control means having a frequency scale and at least one movable part operatively arranged for adjusting the frequency of the oscillations over a predetermined continuous frequency range in accordance with the indication on the frequency scale; a receiver element for converting the electric oscillations of said source into sound energy; an attenuation element including attenuation control means having an attenuation scale and at least one movable part for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a zero hearing level representing the minimum sound energy barely audible to a normal person and varying unequally over the range of the frequency scale between a minimum value at an intermediate frequency and higher values at frequencies below and above said intermediate frequency; and intercoupling means having a mechanism including a cam member interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of said attenuation control means as indicated on its scale by an adjustment of said frequency control means as indicated on its scale; said attenuation control means having a single scale and a single index cooperating therewith.

19. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; said attenuation control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of said frequency control means and a movable part of said attenuation control means operative to modify in a predetermined manner the magnitude of the oscillations supplied to the receiver at different frequencies for preventing throughout the range of said frequency scale disturbance of the adjustment of said attenuation control means by an adjustment of said frequency control means; said control means, said intercoupling means and said interlocking means being designed, proportioned and correlated to operate so as to enable adjustment of said frequency control means to an indication within a predetermined wide portion of its scale without disturbing the adjustment of said attenuation control means as indicated on its scale when said frequency control means is adjusted to an indication within a correlated limited portion of its scale and to operate said interlocking means in response to an adjustment of said frequency control means for effecting a predetermined adjustment of said attenuation control means to a predetermined indication within a correlated limited portion of its scale when its indication is outside thereof; said other of said control means having a single scale and a single index cooperating therewith.

20. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; said attenuation control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of said frequency control means and a movable part of said attenuation control means operative to modify in a predetermined manner the magnitude of the oscillations supplied to the receiver at different frequencies for preventing throughout the range of said frequency scale disturbance of the adjustment of said attenuation control means by an adjustment of said frequency control means; said control means, said intercoupling means and said interlocking means being designed, proportioned and correlated to operate so as to enable adjustment of said frequency control means to an indication within a predetermined limited portion of its scale without disturbing the adjustment of said attenuation control means as indicated on its scale when it is adjusted to an indication within a predetermined wide range of its scale and to operate said interlocking means in response to an adjustment of said frequency control means to an indication other than within a correlated limited portion of its scale for effecting a predetermined adjustment of said attenuation control means to a predetermined indication within a correlated limited portion of its scale if it is outside thereof; said other of said control means having a single scale and a single index cooperating therewith.

21. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; said attenuation control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of said frequency control means and a movable part of said attenuation control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of said frequency control means to an indication within a predetermined wide portion of its scale without disturbing the adjustment of said attenuation control means as indicated on its scale when said frequency control means is adjusted to an indication within a predetermined limited portion of its scale and to cause said interlocking means to prevent adjustment of said attenuation control means to an indication other than within a correlated limited portion of its scale when said frequency control means is adjusted to an indication outside a correlated limited portion of its scale; said other of said control means having a single scale and a single index cooperating therewith.

22. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; said attenuation scale being calibrated to indicate variations of the sound energy from a level varying unequally over the range of the frequency scale between a minimum value at an intermediate frequency and higher values at frequencies below and above said intermediate frequency; said attenuation control means having two movable rheostat parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of said frequency control means and a movable part of said attenuation control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of said frequency control means to an indication within a predetermined wide portion of its scale without disturbing the adjustment of said attenuation control means as indicated on its scale when said frequency control means is adjusted to an indication within a predetermined limited portion of its scale and to cause said interlocking means to prevent adjustment of said attenuation control means to an indication other than within a correlated limited portion of its scale when said frequency control means is adjusted to an indication outside a correlated limited portion of its scale; said other of said control means having a single scale and a single index cooperating therewith.

23. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a correlated limited portion of its scale and to operate said interlocking means in response to an adjustment of said one of said control means for effecting a predetermined adjustment of the other of said control means to a predetermined indication within a correlated limited portion of its scale when its indication is outside thereof.

24. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuaton element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means is adjusted to an indication within a predetermined limited portion of its scale and to cause said interlocking means to prevent adjustment of said other of said control means to an indication other than within a correlated limited portion of its scale when said one of said control means is adjusted to an indication outside a correlated limited portion of its scale.

25. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a level varying unegally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a correlated limited portion of its scale and to operate said interlocking means in response to an adjustment of said one of said control means for effecting a predetermined adjustment of the other of said control means to a predetermined indication within a correlated limited portion of its scale when its indication is outside thereof; said other of said control means having a single scale and a single index cooperating therewith.

26. In an apparatus for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; a receiver element for converting the electric oscillations of said source into sound energy; an attenuation element including relatively movable attenuation control means having an attenuation scale for adjusting the magnitude of the electric oscillations supplied to said receiver element in accordance with the indication on the attenuation scale; at least one of said elements being unequally efficient at different frequencies; said attenuation scale being calibrated to indicate variations of the sound energy from a level varying unequally over the range of the frequency scale between a minimum value at an intermediate frequency and higher values at frequencies below and above said intermediate frequency; at least one of said control means having two movable parts movable relatively to each other and including interlocking means for confining their relative motion in a predetermined manner; one of said movable parts being biased to remain stationary and being actuated to move in response to the operation of said interlocking means; and intercoupling means including a mechanism interlinking a movable part of one of said control means and a movable part of the other of said control means operative to modify in a predetermined manner the magnitude of the oscillations supplied to the receiver at different frequencies for preventing throughout the range of said frequency scale disturbance of the adjustment of one of said control means by an adjustment of the other of said control means; said control means, said intercoupling means and said interlocking means being designed, proportioned and correlated to operate so as to enable adjustment of one of said control means to an indication within a predetermined wide portion of its scale without disturbing the adjustment of the other of said control means as indicated on its scale when the other of said control means is adjusted to an indication within a predetermined limited portion of its scale and to cause said interlocking means to prevent adjustment of said other of said control means to an indication other than within a correlated limited portion of its scale when said one of said control means is adjusted to an indication outside a correlated limited portion of its scale; said other of said control means having a single scale and a single index cooperating therewith.

27. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement.

28. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required mesaurement; said interlinking mechanism including two cam surfaces correlated to said different measuring scales and arranged to be actuated in response to the operation of said selector means so that a different cam surface forms a part of the intercoupling connection intercoupling said control means.

29. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement.

30. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means comprising an interlinking mechanism interlinking a movable part of one of said control means and a movable part of the other of said control means having selector means including a selector element movable between different positions corresponding to said different measuring scales for establishing differently operating intercoupling connections between said control means correlated in a predetermined manner in accordance with the different character of the required measurement.

31. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means comprising an interlinking mechanism interlinking a movable part of one of said control means and a movable part of the other of said control means having selector means including a selector element movable between different positions corresponding to said different measuring scales for establishing differently operating intercoupling connections between said control means correlated in a predetermined manner in accordance with the different character of the required measurement; said interlinking mechanism including two cam surfaces correlated to said different measuring scales and arranged to be actuated in response to the operation of said selector means so that a different cam surface forms a part of the intercoupling connection intercoupling said control means.

32. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement; said intercoupling means including means associated with said selector means and said measuring scales operative to expose only the measuring scale corresponding to the character of the required measurement.

33. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement; and switching means operative in response to the operation of said selector means for modifying in a predetermined manner the circuit characteristics of the apparatus in accordance with the character of the required measurement.

34. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means comprising an interlinking mechanism interlinking a movable part of one of said control means and a movable part of the other of said control means having selector means including a selector element movable between different positions corresponding to said different measuring scales for establishing differently operating intercoupling connections between said control means correlated in a predetermined manner in accordance with the different character of the required measurement; said intercoupling means including means associated with said selector means and said measuring scales operative in response to the operation of said selector element to expose only the measuring scale corresponding to the character of the required measurement.

35. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means comprising an interlinking mechanism interlinking a movable part of one of said control means and a movable part of the other of said control means having selector means including a selector element movable between different positions corresponding to said different measuring scales for establishing differently operating intercoupling connections between said control means correlated in a predetermined manner in accordance with the different character of the required measurement; and switching means operative in response to the operation of said selector element for modifying in a predetermined manner the circuit characteristics of the apparatus in accordance with the character of the required measurement.

36. In a measuring apparatus, the combination of: an electric oscillation source element including relatively movable frequency control means having a frequency scale operatively arranged for adjusting the frequency of the oscillations over a predetermined frequency range in accordance with the indication on the frequency scale; an electromechanical transducer element for converting the electric oscillations of said source into sound energy or vice versa; an energy measuring element interconnected between said source element and said transducer element and including relatively movable energy control means having at least two measuring scales for adjusting the magnitude of the energy output of said transducer element in accordance with an indication on one of said measuring scales; said two measuring scales being calibrated to give measurements of different character; and mechanical intercoupling means intercoupling said two control means operative in a predetermined manner to compensate for irregular variations in the operative relation between said source element and said transducer element at different adjustments of one of said control means; said intercoupling means comprising an interlinking mechanism interlinking a movable part of one of said control means and a movable part of the other of said control means having selector means including a selector element movable between different positions corresponding to said different measuring scales for establishing differently operating intercoupling connections between said control means correlated in a predetermined manner in accordance with the different character of the required measurement; said interlinking mechanism including two cam surfaces correlated to said different measuring scales and arranged to be actuated in response to the operation of said selector element so that a different cam surface forms a part of the intercoupling connection intercoupling said control means.

37. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement.

38. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement;

and switching means operative in response to the operation of said selector means for selectively interconnecting one of said transducer elements in accordance with the character of the required measurement.

39. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement; and switching means operative in response to the operation of said selector element for selectively interconnecting one of said transducer elements and for modifying in a predetermined manner the circuit characteristics of the apparatus in accordance with the character of the required measurement.

40. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement; said interlinking mechanism including two cam surfaces correlated to said different measuring scales and arranged to be actuated in response to the operation of said selector element so that a different cam surface forms a part of the intercoupling connection intercoupling said control means.

41. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement; and switching means operative in response to the operation of said selector means for selectively interconnecting one of said transducer elements in accordance with the character of the required measurement; said interlinking mechanism including two cam surfaces correlated to said different measuring scales and arranged to be actuated in response to the operation of said selector element so that a different cam surface forms a part of the intercoupling connection intercoupling said control means.

42. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication of the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement; and switching means operative in response to the operation of said selector element for selectively interconnecting one of said transducer elements and for modifying in a predetermined manner the circuit characteristics of the apparatus in accordance with the character of the required measurement; said interlinking mechanism including two cam surfaces correlated to said different measuring scales and arranged to be actuated in response to the operation of said selector element so that a different cam surface forms a part of the intercoupling connection intercoupling said control means.

43. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means for establishing differently operating intercoupling connections between said control means correlated in a predetermined manner in accordance with the different character of the required measurement; said interlinking mechanism including two cam surfaces correlated to said different measuring scales and arranged to be actuated in response to the operation of said selector element so that a different cam surface forms a part of the intercoupling connection intercoupling said control means; said intercoupling means including means associated with said selector means and said measuring scales operative in response to the operation of said selector element to expose only the measuring scale corresponding to the character of the required measurement.

44. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element conversion in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement; and switching means operative in response to the operation of said selector means for selectively interconnecting one of said transducer elements in accordance with the character of the required measurement; said interlinking mechanism including two cam surfaces correlated to said different measuring scales and arranged to be actuated in response to the operation of said selector element so that a different cam surface forms a part of the intercoupling connection intercoupling said control means; said intercoupling means including means associated with said selector means and said measuring scales operative in response to the operation of said selector element to expose only the measuring scale corresponding to the character of the required measurement.

45. In a measuring apparatus, such as for measuring hearing or the like, the combination of: an electric oscillation source element including relatively movable frequency control means having a frequency scale operatively arranged for adjusting the frequency of the oscillations over a predetermined frequency range in accordance with the indication on the frequency scale; at least two different electromechanical transducer elements for converting the electric oscillations of said source into sound energy or vice versa; an energy measuring element interconnected between said source element and one transducer element and including relatively movable energy control means having at least two measuring scales for adjusting the magnitude of the energy output of said transducer element in accordance with an indication on one of said measuring scales; said two measuring scales being calibrated to give measurements of different character corresponding to said different transducer elements; and mechanical intercoupling means intercoupling said two control means operative in a predetermined manner to compensate for irregular variations in the operative relation between said source element and said transducer element at different adjustments of one of said control means; said intercoupling means having selector means including a selector element movable between different positions corresponding to said different measuring scales for establishing differently operating intercoupling connections between said control means correlated in a predetermined manner in accordance with the different character of the required measurement; and switching means operative in response to the operation of said selector element for selectively interconnecting one of said transducer elements and for modifying in a predetermined manner the circuit characteristics of the apparatus in accordance with the charatcer of the required measurement; said interlinking mechanism including two cam surfaces correlated to said different measuring scales and arranged to be actuated in response to the operation of said selector element so that a different cam surface forms a part of the intercoupling connection intercoupling said control means; said intercoupling means including means associated with said selector means and said measuring scales operative in response to the operation of said selector element to expose only the measuring scale corresponding to the character of the required measurement.

46. In an audiometer, an electric oscillation generator, a frequency selector including a frequency scale for selectively determining the frequency of the oscillations in accordance with the position of the frequency selector as indicated on the frequency scale, a receiver, an attenuator network connected between the oscillation generator, and an attenuation regulator including an attenuation scale for adjusting the degree of the attenuation of the sound output of the receiver in accordance with the position of the attenuation regulator as indicated on the attenuation scale, said frequency selector, said network, and said attenuation regulator being so arranged and correlated as to enable accurate regulation of the sound intensity delivered by the receiver at each selected frequency with a single attenuation scale.

47. In an audiometer, an electric oscillation generator, a frequency selector including a frequency scale for selectively determining the frequency of the oscillations in accordance with the position of the frequency selector as indicated on the frequency scale, a receiver, an attenuator network connected between the oscillation generator, and an attenuation regulator including an attenuation scale for adjusting the degree of the attenuation of the sound output of the receiver in accordance with the position of the attenuation regulator as indicated on the attenuation scale, said frequency selector, said network, and said attenuation regulator being so arranged and correlated that the sound intensity delivered by the receiver is maintained substantially at the value indicated on the attenuation scale while the frequency of the tone is varied over a selected part of the audible frequency range.

48. In an audiometer, an electric oscillation generator, a frequency selector including a frequency scale for selectively determining the frequency of the oscillations in accordance with the position of the frequency selector as indicated on the frequency scale, a receiver, an attenuator network connected between the oscillation generator, and an attenuation regulator including an attenuation scale for adjusting the degree of the attenuation of the sound output of the receiver in accordance with the position of the attenuation regulator as indicated on the attenuation scale, said frequency selector, said network, and said attenuation regulator being so arranged and correlated as to permit at least 80% exploration of the loss of useful hearing if a person in the mid-frequency range of audible hearing as well as in the lower and upper parts of the audible frequency range between about 100 and 8000 cycles.

49. In a device for testing the hearing: the combination of an electric oscillation source element including frequency control means having an adjustable frequency dial for controllably adjusting the frequency of the oscillations in accordance with the indication on the frequency dial; a receiver element for converting the electric energy of said source into sound; and an attenuator device connecting said receiver to said source and having attenuation control means including an adjustable attenuation dial for controllably adjusting the energy volume supplied to said receiver in accordance with the indication on the attenuation dial; said attenuation dial being calibrated to indicate energy variations from a zero hearing level representing the minimum sound energy barely audible to a normal person and varying unequally over the frequency range between a minimum value at an intermediate frequency and higher values in the frequency ranges below and above said intermediate frequency; said attenuation control means being coupled to and subject to the control by said frequency dial and having means actuated to unequally modify in opposite directions said energy volume in different parts of the frequency range and compensate for the unequal variations of the sound energy giving the zero hearing level while the frequency is varied from one end to the other end of the frequency dial for preventing disturbance of any desired adjustment of said attenuator device.

50. A device as specified in claim 49, said attenuator device being adjustable independently and having a single attenuation scale on its dial.

51. A device as specified in claim 49, comprising a variable resistance in shunt of said attenuator device and operable by the frequency dial and constituting the means for controlling the sound energy.

52. In a device for testing the hearing: the combination of an oscillation source element including a frequency dial and an oscillator knob adjustable for controlling the frequency of the oscillations in accordance with the indication on the frequency dial; a receiver element for converting the electric energy of said source into sound; an attenuator rheostat with an attenuation dial and a rotary attenuator knob therefor for controllably adjusting the energy volume supplied to said receiver in accordance with the indication on the attenuation dial; said attenuation dial being calibrated to indicate energy variations from a zero hearing level representing the minimum sound energy barely audible to a normal person and varying unequally over the frequency range between a minimum value at an intermediate frequency and higher values in the frequency ranges below and above said intermediate frequency, an adjustable rheostat in shunt to said attenuator rheostat, and means operated by said oscillator knob to operate said shunt rheostat to unequally modify in opposite directions said energy volume in different parts of the frequency range and compensate for the unequal variations of the sound energy giving the zero hearing level while the frequency is varied from one end to the other end of the frequency dial so as to prevent disturbing said attenuator rheostat.

53. An audiometer device for testing the hearing comprising: an oscillation source element including frequency control means having a frequency dial for controllably adjusting the frequency of the oscillations in accordance with the indication on the frequency dial; a receiver element for converting the energy of said source into sound; and an attenuation control device connecting said receiver to said source, including adjusting means having an attenuation dial for adjusting the energy volume supplied to said receiver in accordance with the indication on the attenuation dial; said attenuation dial being calibrated to indicate energy variations from a zero hearing level representing the minimum sound energy barely audible to a normal person and varying unequally between a minimum value at an intermediate frequency and higher values in the frequency ranges below and above said intermediate frequency; in combination with means actuated by the frequency control means to unequally modify in opposite directions said energy volume in different parts of the frequency range while the frequency is varied from one end to the other end of the frequency dial so that the frequency control dial serves also to control the volume of the energy and compensate for the unequal variations of the sound energy giving the zero hearing level.

54. A device as specified in claim 53, comprising means for controlling the energy volume by the adjustment of the frequency control dial, while preventing any disturbance of the indicated volume on the attenuation dial.

55. In an audiometer instrument for testing the hearing: the combination of an oscillation source element including a frequency control having a graduated frequency scale with a frequency indicator for traversing the graduated path of travel by a relative movement between the scale and indicator and controllably adjusting the frequency of the oscillations in accordance with the indication on the scale; a receiver element for converting the electric energy of said source into sound; an attenuation control device connecting said receiver to said source including attenuator adjusting means having a graduated attenuation scale with an attenuation indicator for traversing the graduated path of travel thereof by relative movement between said attenuation indicator and said attenuation scale and adjusting the energy volume supplied to said receiver in accordance with the indication on the attenuation scale; said attenuation scale being calibrated to indicate energy variations from a zero hearing level representing the minimum sound energy barely audible to a normal person and varying unequally over the frequency range between a minimum value at an intermediate frequency and higher values in the frequency ranges below and above said intermediate frequency; and instrumentalities inter-relating said frequency control and said attenuation control device to provide attenuation control by the adjustment of the frequency control and actuated to unequally modify in opposite directions said energy volume in different parts of the frequency range and compensate for the unequal variations of the sound energy giving the zero hearing level while the frequency is varied from one end to the other end of the frequency scale for preventing any disturbance of the indicated reading on the graduated attenuation scale.

HEIMAN W. KOREN.